United States Patent
Wang et al.

(10) Patent No.: US 10,452,605 B2
(45) Date of Patent: Oct. 22, 2019

(54) METHOD AND APPARATUS FOR TASK SCHEDULING ON HETEROGENEOUS MULTI-CORE RECONFIGURABLE COMPUTING PLATFORM

(71) Applicants: Huawei Technologies Co., Ltd., Shenzhen (CN); University of Science and Technology of China, Hefei (CN)

(72) Inventors: Chao Wang, Hefei (CN); Xi Li, Hefei (CN); Xuehai Zhou, Hefei (CN); Junneng Zhang, Hefei (CN); Peng Chen, Hefei (CN); Qi Guo, Hefei (CN)

(73) Assignees: Huawei Technologies Co., Ltd., Shenzhen (CN); University of Science and Technology of China, Hefei (CN)

(*) Notice: Subject to any disclaimer, the term of this patent is extended or adjusted under 35 U.S.C. 154(b) by 197 days.

(21) Appl. No.: 15/621,768

(22) Filed: Jun. 13, 2017

(65) Prior Publication Data

US 2017/0277654 A1 Sep. 28, 2017

Related U.S. Application Data

(63) Continuation of application No. PCT/CN2015/095249, filed on Nov. 23, 2015.

(30) Foreign Application Priority Data

Mar. 27, 2015 (CN) .......................... 2015 1 0142346

(51) Int. Cl.
*G06F 9/46* (2006.01)
*G06F 15/177* (2006.01)
(Continued)

(52) U.S. Cl.
CPC .............. *G06F 15/177* (2013.01); *G06F 9/48* (2013.01); *G06F 9/4843* (2013.01);
(Continued)

(58) Field of Classification Search
CPC ...... G06F 9/4881; G06F 9/505; G06F 15/177; G06F 9/48; G06F 9/4843; G06F 9/5083; G06F 9/50
See application file for complete search history.

(56) References Cited

U.S. PATENT DOCUMENTS

| 9,396,010 B2 * | 7/2016 | Vincent ................. G06F 9/5094 |
| 2001/0039581 A1 * | 11/2001 | Deng ..................... G06F 9/5044 |
| | | 709/226 |

(Continued)

FOREIGN PATENT DOCUMENTS

| CN | 101630305 A | 1/2010 |
| CN | 101710292 A | 5/2010 |

(Continued)

OTHER PUBLICATIONS

Wang, "Study on Reconfigurable Heterogenous Multi Processor System on Chip," Dissertation for Doctorate degree, China University of Science and Technology (Sep. 15, 2011).

*Primary Examiner* — Camquy Truong
(74) *Attorney, Agent, or Firm* — Leydig, Voit & Mayer, Ltd.

(57) ABSTRACT

A method for task scheduling on a heterogeneous multi-core reconfigurable computing platform is disclosed, the method includes: determining an execution manner of a target task according to popularity of the to-be-executed target task and usage of a reconfigurable resource of the heterogeneous multi-core reconfigurable computing platform, where the execution manner includes a hardware manner or a software manner, for the target task, there is no corresponding target intellectual property IP core for executing the target task on the heterogeneous multi-core reconfigurable computing platform, the popularity of the target task is used to indicate central processing unit CPU usage of the target task, and the usage of the reconfigurable resource is used to indicate a (Continued)

100 — Determine an execution manner of a target task according to popularity of the to-be-executed target task and usage of a reconfigurable resource of a heterogeneous multi-core reconfigurable computing platform, where the execution manner includes a hardware manner or a software manner, for the target task, there is no corresponding target intellectual property IP core for executing the target task on the heterogeneous multi-core reconfigurable computing platform, the popularity of the target task is used to indicate central processing unit CPU usage of the target task, and the usage of the reconfigurable resource is used to indicate a usage status of the reconfigurable resource — S110

Execute the target task according to the determined execution manner — S120 usage status of the reconfigurable resource; and executing the target task according to the determined execution manner.

21 Claims, 7 Drawing Sheets

(51) Int. Cl.
G06F 9/48 (2006.01)
G06F 9/50 (2006.01)

(52) U.S. Cl.
CPC ............ *G06F 9/4881* (2013.01); *G06F 9/505* (2013.01); *G06F 9/5083* (2013.01); *G06F 9/50* (2013.01); *G06F 9/5066* (2013.01)

(56) References Cited

U.S. PATENT DOCUMENTS

| | | | |
|---|---|---|---|
| 2004/0054999 A1 | 3/2004 | Willen et al. | |
| 2008/0155442 A1* | 6/2008 | Pannese | G05B 19/41885 715/771 |
| 2014/0196050 A1* | 7/2014 | Yu | G06F 9/5088 718/104 |
| 2014/0317378 A1 | 10/2014 | Lippett | |

FOREIGN PATENT DOCUMENTS

| | | |
|---|---|---|
| CN | 101833368 A | 9/2010 |
| CN | 102360309 A | 2/2012 |
| CN | 102508712 A | 6/2012 |
| CN | 102629218 A | 8/2012 |
| CN | 102681901 A | 9/2012 |
| CN | 104778083 A | 7/2015 |
| EP | 1574965 A1 | 9/2005 |

* cited by examiner

100 — Determine an execution manner of a target task according to popularity of the to-be-executed target task and usage of a reconfigurable resource of a heterogeneous multi-core reconfigurable computing platform, where the execution manner includes a hardware manner or a software manner, for the target task, there is no corresponding target intellectual property IP core for executing the target task on the heterogeneous multi-core reconfigurable computing platform, the popularity of the target task is used to indicate central processing unit CPU usage of the target task, and the usage of the reconfigurable resource is used to indicate a usage status of the reconfigurable resource ~S110

Execute the target task according to the determined execution manner ~S120

FIG. 1

METHOD AND APPARATUS FOR TASK SCHEDULING ON HETEROGENEOUS MULTI-CORE RECONFIGURABLE COMPUTING PLATFORM

CROSS-REFERENCE TO RELATED APPLICATIONS

This application is a continuation of International Application No. PCT/CN2015/095249, filed on Nov. 23, 2015, which claims priority to Chinese Patent Application No. 201510142346.X, filed on Mar. 27, 2015. The disclosures of the aforementioned applications are hereby incorporated by reference in their entireties.

TECHNICAL FIELD

The present invention relates to the computer field, and more specifically, to a method and an apparatus for task scheduling on a heterogeneous multi-core reconfigurable computing platform.

BACKGROUND

At present, there are two representation forms for a computational task: on a general purpose processor (GPP), the task is generally presented in a form of software code, which is referred to as a software task; while on an application-specific integrated circuit, the task is generally presented in a form of an application-specific hardware circuit, which is referred to as a hardware task. The software task has advantages of good flexibility and being easy to modify and debug, and has a disadvantage of unsatisfactory computation speed; while the hardware task has an advantage of high speed, and has disadvantages of being less flexible and not easy to debug. A heterogeneous multi-core reconfigurable computing platform is an effective means to balance a general purpose processor and an application-specific integrated circuit. The heterogeneous multi-core reconfigurable computing platform not only can achieve a quite high speedup ratio by using a reconfigurable logic component, but also can have good flexibility by using a reconfigurable technology or adding a general purpose processor. In addition, the heterogeneous multi-core reconfigurable computing platform can overcome deficiencies, such as high costs of the application-specific integrated circuit caused due to a complex design and manufacturing process at an early stage and non-reusability.

Reconfigurable resources (namely, hardware logical resources) on the heterogeneous multi-core reconfigurable computing platform are usually quite limited, and it is required to perform reconfiguration on the reconfigurable resources, so as to implement hardware execution of a task. Hardware resource reconfiguration on the heterogeneous multi-core reconfigurable computing platform can be classified into static reconfiguration and dynamic reconfiguration. Static reconfiguration refers to static reconfiguration of hardware logical resources of a system. That is, online programming is performed in various manners during an idle period of the system, so as to perform configuration of logical functions of a reconfigurable hardware logic component. Dynamic reconfiguration refers to performing dynamic configuration of logical functions of a reconfigurable logic component in real time during a real-time operating period of a system. For example, re-configuration can be performed only on a logical unit (namely, a reconfigurable resource) that needs to be modified in the system, which does not affect normal operation of an unmodified logical unit. Relative to the static reconfiguration, the dynamic reconfiguration shortens reconfiguration time, which on the one hand reduces overheads of the system, and on the other hand improves the operating efficiency of the system. To improve resource usage, in the prior art, a heterogeneous multi-core reconfigurable computing platform generally uses dynamic reconfiguration.

At present, a heterogeneous multi-core reconfigurable computing platform generally uses a Window-based method for task migration to perform reconfiguration. A window is defined as a time interval between current reconfiguration and next reconfirmation. A window includes three phases: a Hardware Execution time, a Scheduling time, and a Reconfiguration time, where the scheduling time is hidden in the hardware execution time. In the prior art, a size of a reconfiguration window is fixed, and the size of the window affects system performance. For example, an excessively large window causes a reconfigurable resource to be in an idle state for a long period of time, which lowers resource usage and system performance. An excessively small window causes excessively frequent system reconfiguration, thereby introducing extra reconfiguration overheads and lowering system performance.

SUMMARY

Embodiments of the present invention provide a method and an apparatus for task scheduling on a heterogeneous multi-core reconfigurable computing platform, where an execution manner of a task is determined according to an execution status of the task and a usage status of a reconfigurable resource on the computing platform, so that usage of the reconfigurable resource on the heterogeneous multi-core reconfigurable computing platform can be effectively improved.

According to a first aspect, a method for task scheduling on a heterogeneous multi-core reconfigurable computing platform is provided, where the method includes:

determining an execution manner of a target task according to popularity of the to-be-executed target task and usage of a reconfigurable resource of the heterogeneous multi-core reconfigurable computing platform, where the execution manner includes a hardware manner or a software manner, for the target task, there is no corresponding target intellectual property IP core for executing the target task on the heterogeneous multi-core reconfigurable computing platform, the popularity of the target task is used to indicate central processing unit CPU usage of the target task, and the usage of the reconfigurable resource is used to indicate a usage status of the reconfigurable resource; and executing the target task according to the determined execution manner.

With reference to the first aspect, in a first possible implementation manner of the first aspect, the determining an execution manner of a target task according to popularity of the target task and the usage of a reconfigurable resource of the heterogeneous multi-core reconfigurable computing platform includes:

determining weighted popularity $C_w$ of the target task according to the popularity of the target task, where $C_w=C \cdot S$, C is the popularity of the target task, $C=N_1 \cdot T_1/T_L$, $T_L$ is a time length between a current time point and a time point at which reconfiguration is performed on the reconfigurable resource last time, $N_1$ is a quantity of times for which the target task is executed within $T_L$ in the software manner, $T_1$ is a time length required for a single execution of the target task in the software manner, S is a hardware speedup ratio of the target task, and the hardware speedup ratio S is used to indicate a ratio between a corresponding execution speed at which the target task is executed in the hardware manner and a corresponding execution speed at which the target task is executed in the software manner;

determining the usage $E_{ave}$ of the reconfigurable resource of the heterogeneous multi-core reconfigurable computing platform according to the following formulas:

$$E_{ave} = \frac{\sum_{i=1}^{M} E_i}{M}$$

$$E_i = \frac{N_2^i \cdot T_2^i}{T_L} \ (i = 1, 2, \ldots, M),$$

where M is a quantity of IP cores deployed on the heterogeneous multi-core reconfigurable computing platform, $E_i$ is IP core usage of an $i^{th}$ IP core in the M IP cores deployed on the heterogeneous multi-core reconfigurable computing platform, $T_L$ is the time length between the current time point and the time point at which reconfiguration is performed on the reconfigurable resource last time, $N_2^i$ is a quantity of times for which the $i^{th}$ IP core executes a task corresponding to the $i^{th}$ IP core within the time length $T_L$, and $T_2^i$ is a time length required for the $i^{th}$ IP core to execute the corresponding task once; and determining the execution manner of the target task according to the weighted popularity $C_w$ of the target task and the usage $E_{ave}$ of the reconfigurable resource.

With reference to the first possible implementation manner of the first aspect, in a second possible implementation manner of the first aspect, the determining the execution manner of the target task according to the weighted popularity $C_w$ of the target task and the usage $E_{ave}$ of the reconfigurable resource includes:

when it is determined that the weighted popularity $C_w$ of the target task is greater than or equal to a product of $E_{ave}$ and k, determining that the execution manner of the target task is the hardware manner, where k is a reconfiguration coefficient of the heterogeneous multi-core reconfigurable computing platform, and is used to indicate a reconfiguration overhead of the heterogeneous multi-core reconfigurable computing platform; or when it is determined that the weighted popularity $C_w$ of the target task is less than a product of $E_{ave}$ and k, determining that the execution manner of the target task is the software manner.

With reference to the first aspect or either possible implementation manner of the first and the second possible implementation manners of the first aspect, in a third possible implementation manner of the first aspect, the method further includes:

determining a to-be-executed task; and when an IP core for executing the to-be-executed task is not deployed on the heterogeneous multi-core reconfigurable computing platform, determining the to-be-executed task as the to-be-executed target task.

With reference to the first aspect or any one possible implementation manner of the first to the third possible implementation manners of the first aspect, in a fourth possible implementation manner of the first aspect, the heterogeneous multi-core reconfigurable computing platform includes multiple reconfigurable resource packages, where when determining that the execution manner of the target task is the hardware manner, the executing the target task according to the determined execution manner includes:

reconfiguring at least one reconfigurable resource package in the multiple reconfigurable resource packages to be the target IP core for executing the target task; and executing the target task by using the target IP core.

With reference to the fourth possible implementation manner of the first aspect, in a fifth possible implementation manner of the first aspect, the reconfiguring at least one reconfigurable resource package in the multiple reconfigurable resource packages to be the target IP core that is capable of executing the target task includes:

reconfiguring a target reconfigurable resource package in the multiple reconfigurable resource packages to be the target IP core, where the target reconfigurable resource package is a reconfigurable resource package with a longest idle time in the multiple reconfigurable resource packages.

With reference to the third possible implementation manner of the first aspect, in a sixth possible implementation manner of the first aspect, the method further includes:

when an IP core for indicating the to-be-executed task is deployed on the heterogeneous multi-core reconfigurable computing platform, determining that an execution manner of the to-be-executed task is hardware execution.

According to a second aspect, an apparatus for task scheduling on a heterogeneous multi-core reconfigurable computing platform is provided, where the apparatus includes:

a first determining module, configured to determine an execution manner of a target task according to popularity of the to-be-executed target task and usage of a reconfigurable resource of the heterogeneous multi-core reconfigurable computing platform, where the execution manner includes a hardware manner or a software manner, for the target task, there is no corresponding target intellectual property IP core for executing the target task on the heterogeneous multi-core reconfigurable computing platform, the popularity of the target task is used to indicate central processing unit CPU usage of the target task, and the usage of the reconfigurable resource is used to indicate a usage status of the reconfigurable resource; and an execution module, configured to execute the target task according to the execution manner determined by the first determining module.

With reference to the second aspect, in a first possible implementation manner of the second aspect, in terms of determining the execution manner of the target task according to the popularity of the target task and the usage of the reconfigurable resource of the heterogeneous multi-core reconfigurable computing platform, the first determining module is specifically configured to:

determine weighted popularity $C_w$ of the target task according to the popularity of the target task, where $C_w = C \cdot S$, C is the popularity of the target task, $C = N_1 \cdot T_1/T_L$, $T_L$ is a time length between a current time point and a time point at which reconfiguration is performed on the reconfigurable resource last time, $N_1$ is a quantity of times for which the target task is executed within $T_L$ in the software manner, $T_1$ is a time length required for a single execution of the target task in the software manner, S is a hardware speedup ratio of the target task, and the hardware speedup ratio S is used to indicate a ratio between a corresponding execution speed at which the target task is executed in the hardware manner and a corresponding execution speed at which the target task is executed in the software manner;

determine the usage $E_{ave}$ of the reconfigurable resource of the heterogeneous multi-core reconfigurable computing platform according to the following formulas:

$$E_{ave} = \frac{\sum_{i=1}^{M} E_i}{M}$$

$$E_i = \frac{N_2^i \cdot T_2^i}{T_L} \quad (i = 1, 2, \ldots, M),$$

where M is a quantity of IP cores deployed on the heterogeneous multi-core reconfigurable computing platform, $E_i$ is IP core usage of an $i^{th}$ IP core in the M IP cores deployed on the heterogeneous multi-core reconfigurable computing platform, $T_L$ is the time length between the current time point and the time point at which reconfiguration is performed on the reconfigurable resource last time, $N_2$ is a quantity of times for which the $i^{th}$ IP core executes a task corresponding to the $i^{th}$ IP core within the time length $T_L$, and $T_2^i$ is a time length required for the $i^{th}$ IP core to execute the corresponding task once; and determine the execution manner of the target task according to the weighted popularity $C_w$ of the target task and the usage $E_{ave}$ of the reconfigurable resource.

With reference to the first possible implementation manner of the second aspect, in a second possible implementation manner of the second aspect, in terms of determining the execution manner of the target task according to the weighted popularity $C_w$ of the target task and the usage $E_{ave}$ of the reconfigurable resource, the first determining module is specifically configured to:

when it is determined that the weighted popularity $C_w$ of the target task is greater than or equal to a product of $E_{ave}$ and k, determine that the execution manner of the target task is the hardware manner, where k is a reconfiguration coefficient of the heterogeneous multi-core reconfigurable computing platform, and is used to indicate a reconfiguration overhead of the heterogeneous multi-core reconfigurable computing platform; or when it is determined that the weighted popularity $C_w$ of the target task is less than a product of $E_{ave}$ and k, determine that the execution manner of the target task is the software manner.

With reference to the second aspect or either possible implementation manner of the first and the second possible implementation manners of the second aspect, in a third possible implementation manner of the second aspect, the apparatus further includes:

a second determining module, configured to determine a to-be-executed task; and a third determining module, configured to: when an IP core for executing the to-be-executed task is not deployed on the heterogeneous multi-core reconfigurable computing platform, determine the to-be-executed task as the to-be-executed target task.

With reference to the second aspect or any one possible implementation manner of the first to the third possible implementation manners of the second aspect, in a fourth possible implementation manner of the second aspect, the heterogeneous multi-core reconfigurable computing platform includes multiple reconfigurable resource packages, and in terms of executing the target task according to the determined execution manner, the execution module is specifically configured to:

when it is determined that the execution manner of the target task is the hardware manner, reconfigure at least one reconfigurable resource package in the multiple reconfigurable resource packages to be the target IP core for executing the target task; and execute the target task by using the target IP core.

With reference to the fourth possible implementation manner of the second aspect, in a fifth possible implementation manner of the second aspect, in terms of reconfiguring the at least one reconfigurable resource package in the multiple reconfigurable resource packages to be the target IP core that is capable of executing the target task, the execution module is specifically configured to:

reconfigure a target reconfigurable resource package in the multiple reconfigurable resource packages to be the target IP core, where the target reconfigurable resource package is a reconfigurable resource package with a longest idle time in the multiple reconfigurable resource packages.

With reference to the third possible implementation manner of the second aspect, in a sixth possible implementation manner of the second aspect, the apparatus further includes:

a fourth determining module, configured to: when an IP core for indicating the to-be-executed task is deployed on the heterogeneous multi-core reconfigurable computing platform, determine that an execution manner of the to-be-executed task is hardware execution.

Based on the foregoing technical solutions, in the embodiments of the present invention, an execution manner of the target task is determined according to popularity of the target task and usage of a reconfigurable resource of the heterogeneous multi-core reconfigurable computing platform. The execution manner of the task is determined dynamically according to an execution status of the task and a usage status of the reconfigurable resource of the computing platform, which can implement appropriate use of the reconfigurable resource. With respect to a problem in the prior art that frequent IP core reconfiguration is caused or some tasks are kept in a wait state for a long period of time resulting from a fact that a user specifies an execution manner of a task, the method provided in the embodiments of the present invention can effectively improve usage of a reconfigurable resource on a heterogeneous multi-core reconfigurable computing platform, and therefore can improve overall performance of the computing platform.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 shows a schematic flowchart of a method for task scheduling on a heterogeneous multi-core reconfigurable computing platform according to an embodiment of the present invention;

DESCRIPTION OF EMBODIMENTS

Figure 2:
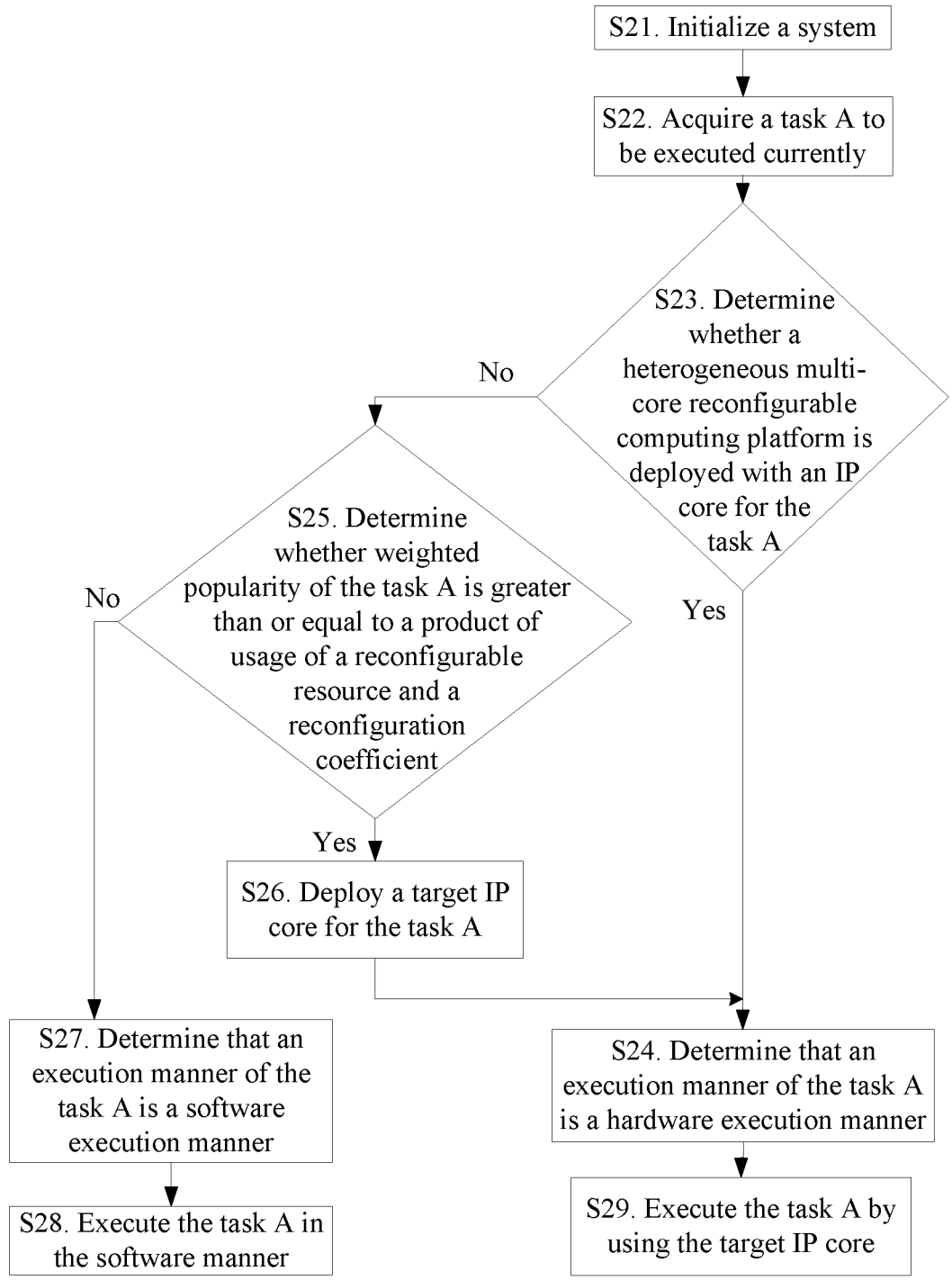
FIG. 2 shows another schematic flowchart of a method for task scheduling on a heterogeneous multi-core reconfigurable computing platform according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, in the embodiments of the present invention, a heterogeneous multi-core reconfigurable computing platform refers to a computing system integrating both a general purpose processor (GPP) such as a central processing unit (CPU), and a field programmable gate array (FPGA) on a single physical chip, where the FPGA features hardware reconfigurability. Specifically, a multi-core feature of the computing platform is specifically: multiple computation modules are integrated on the single physical chip, where the multiple computation modules include but are not limited to multiple general purpose processors, multiple intellectual property (IP) cores, multiple specific-application processors, and the like, where an IP core refers to a logic circuit for implementing a specific function on the physical chip, and generally belongs to a hardware scope. On this basis, a heterogeneity feature of the computing platform is specifically: more than one type of computation modules is included in the multiple computation modules integrated on the single physical chip. A reconfigurability feature of the computing platform is specifically a dynamic change of a functional unit of a computation module, for example, a first IP core, integrated on the physical chip, for implementing a first function is changed into a second IP core for implementing a second function, which is reconfigurability.

In the embodiments of the present invention, a reconfigurable resource refers to a reconfigurable hardware resource on the heterogeneous multi-core reconfigurable computing platform, and specifically refers to a logical resource of the FPGA integrated on the physical chip, where the FPGA features hardware reconfigurability.

In the embodiments of the present invention, the IP core refers to a hardware module, constructed by using the reconfigurable resource, for implementing a function, and specifically refers to a hardware module set up by using a basic gate circuit on the FPGA.

On the heterogeneous multi-core reconfigurable computing platform, executing a task in a software manner refers to executing the task on a general purpose processor GPP, that is, presenting the task in a form of software code, where the task may also be referred to as a software task; executing a task in a hardware manner refers to executing the task on a specific-application integrated circuit (namely, a circuit module for completing the task), that is, presenting the task in a form of a hardware circuit, where the task may also be referred to as a hardware task. That is, executing the task in the hardware manner refers to executing, based on a reconfigurable resource, the task on an IP core that is capable of executing the task. It should be understood that for executing a target task in the hardware manner, an IP core that is constructed based on a reconfigurable resource and that can complete the target task is required.

It should be understood that, in the embodiments of the present invention, the reconfigurable resource, for example, a field programmable gate array (FPGA) of the heterogeneous multi-core reconfigurable computing platform can be divided into multiple reconfigurable resource packages with equal areas or unequal areas, where deployment of the reconfigurable resource packages is fixed after a system is started each time, and modification is not allowed. After the system is started, an IP core that may be deployed on each reconfigurable resource package can be changed dynamically, that is, a function that can be implemented by each reconfigurable resource package changes dynamically. Multiple IP cores with different functions may be deployed on one reconfigurable resource package, and one IP core may also be deployed on multiple reconfigurable resource packages. Further description is provided with reference to FIG. 6 in the following.

It should be further understood that an IP core is a hardware function module that is constructed based on a reconfigurable resource and for implementing a function; therefore, the IP core may be considered as a form of the reconfigurable resource, and usage of the IP core reflects usage of the reconfigurable resource, where the usage of the IP core refers to a frequency at which the IP core executes a task.

It should be understood that in the embodiments of the present invention, a function of a hardware task refers to a function requested by the hardware task or a function that can be implemented when the hardware task is executed. For example, the function may be logical operation, matrix operation, video processing, or the like. A hardware platform can provide, for a user program by using a marker bit, an interface for transmitting a hardware function, and determine a function of a hardware task according to the interface. On the heterogeneous multi-core reconfigurable computing platform, each task that can be operated on the reconfigurable logical resource generally has a corresponding software version.

Optionally, the heterogeneous multi-core reconfigurable computing platform refers to a computer system that includes modules such as a computation module, a storage module, an interconnection module, a related periphery, and the like, which is not limited in the present invention, however.

For ease of understanding and description in the following, the heterogeneous multi-core reconfigurable computing platform is referred to as a computing platform or a system for short.

FIG. 1 shows a schematic flowchart of a method 100 for task scheduling on a heterogeneous multi-core reconfigurable computing platform according to an embodiment of the present invention, where the heterogeneous multi-core reconfigurable computing platform includes multiple reconfigurable resource packages, and the method 100 may be executed, for example, by the computing platform (for example, the computing platform may be a computer). As shown in FIG. 1, the method 100 includes the following steps:

S110: Determine an execution manner of a target task according to popularity of the to-be-executed target task and usage of a reconfigurable resource of a heterogeneous multi-core reconfigurable computing platform, where the execution manner includes a hardware manner or a software manner, for the target task, there is no corresponding target intellectual property IP core for executing the target task on the heterogeneous multi-core reconfigurable computing platform, the popularity of the target task is used to indicate central processing unit CPU usage of the target task, and the usage of the reconfigurable resource is used to indicate a usage status of the reconfigurable resource.

Specifically, the target task is a computational task to be executed at a current time point, where an IP core that is capable of executing the target task is not deployed on the computing platform. It should be understood that because an IP core that is capable of executing the target task is not deployed on the computing platform, before S110, the target task is executed in the software manner by a processor GPP (which is specifically a central processing unit CPU in this embodiment of the present invention).

The popularity of the target task represents CPU occupancy of the target task within a time period before the current time point, namely, a quantity of times for execution in the software manner. Herein, the mentioned time period before the current time point may be, for example, a time period from a time point at which IP core reconfiguration is performed on the reconfigurable resource last time to the current time point. The usage of the reconfigurable resource of the heterogeneous multi-core reconfigurable computing platform is specifically determined, for example, according to usage of all IP cores deployed on the computing platform (where these deployed IP cores are not used for executing the target task to be executed currently). Usage of one IP core is used to represent, during the time period from the time point at which the IP core reconfiguration is performed on the reconfigurable resource last time to the current time period, a quantity of times for which the IP core executes a task (a task that is corresponding to a function and can be executed by the IP core) corresponding to an $i^{th}$ IP core. Detailed description is provided in the following.

S120: Execute the target task according to the determined execution manner.

In this embodiment of the present invention, the execution manner of the target task is determined according to the popularity of the target task and the usage of the reconfigurable resource of the heterogeneous multi-core reconfigurable computing platform. That is, the execution manner of the task is determined dynamically according to an execution status of the task and a usage status of the reconfigurable resource of the computing platform, which can implement appropriate use of the reconfigurable resource. With respect to a problem in the prior art that frequent IP core reconfiguration is caused or some tasks are kept in a wait state for a long period of time resulting from a fact that a user specifies an execution manner of a task, the method provided in this embodiment of the present invention can effectively improve usage of a reconfigurable resource on a heterogeneous multi-core reconfigurable computing platform, and therefore can improve overall performance of the computing platform.

Optionally, in this embodiment of the present invention, S110 of determining the execution manner of the target task according to the popularity of the target task and the usage of the reconfigurable resource of the heterogeneous multi-core reconfigurable computing platform includes:

S111: Determine weighted popularity $C_w$ of the target task according to the popularity of the target task, where $C_w = C \cdot S$, C is the popularity of the target task, $C = N_1 \cdot T_1 / T_L$, $T_L$ is a time length between a current time point and a time point at which reconfiguration is performed on the reconfigurable resource last time, $N_1$ is a quantity of times for which the target task is executed within $T_L$ in the software manner, $T_1$ is a time length required for a single execution of the target task in the software manner, S is a hardware speedup ratio of the target task, and the hardware speedup ratio S is used to indicate a ratio between a corresponding execution speed at which the target task is executed in the hardware manner and a corresponding execution speed at which the target task is executed in the software manner.

The time point at which reconfiguration is performed on the reconfigurable resource last time refers to a time point that is before the current time point and at which latest IP core reconfiguration is performed, for example, a time point t1 that is before a current time point t2 and at which the latest IP core reconfiguration is performed on the reconfigurable resource of the heterogeneous multi-core reconfigurable computing platform. That is, within a time period $T_L$ from t1 to t2, reconfiguration is not performed on an IP core deployed on the computing platform.

The popularity C of the target task represents CPU occupancy of the target task within the time length $T_L$. It should be understood that higher popularity C of the target task represents a higher quantity of times for which the target task is executed on the computing platform. The popularity C of the target task may also be referred to as a priority of the target task.

Assuming that the corresponding execution speed at which the target task is executed in the hardware manner is R1, and the corresponding execution speed at which the target task is executed in the software manner is R2, the hardware speedup ratio S of the target task is R1/R2. It should be understood that, it may be estimated, according to a ratio between a first time required for implementing the target task in the software manner and a second time required for implementing the target task in the hardware manner, the hardware speedup ratio S of the target task is R1/R2, which is not limited in this embodiment of the present invention.

The weighted popularity of the target task is $C_w = C \cdot S$, which represents a priority, relative to a task of another function, of the target task when being executed by using a corresponding IP core. That is, significance of deploying a target IP core, for the target task, for executing the target task is indicated. For example, it may be determined, by comparing weighted popularity of a task A and that of a task B, that a corresponding IP core is deployed for which task preferentially, where when being executed by using an IP core, a task with higher weighted popularity $C_w$ has a performance advantage over a task with lower weighted popularity $C_w$.

S112: Determine the usage $E_{ave}$ of the reconfigurable resource of the heterogeneous multi-core reconfigurable computing platform according to the following formulas:

$$E_{ave} = \frac{\sum_{i=1}^{M} E_i}{M}$$

$$E_i = \frac{N_2^i \cdot T_2^i}{T_L} \quad (i = 1, 2, \ldots, M),$$

where M is a quantity of IP cores deployed on the heterogeneous multi-core reconfigurable computing platform, $E_i$ is IP core usage of an $i^{th}$ IP core in the M IP cores deployed on the heterogeneous multi-core reconfigurable computing platform, $T_L$ is the time length between the current time point and the time point at which reconfiguration is performed on the reconfigurable resource last time, $N_2^i$ is a quantity of times for which the $i^{th}$ IP core executes a task corresponding to the $i^{th}$ IP core within the time length $T_L$, and $T_2^i$ is a time length required for the $i^{th}$ IP core to execute the corresponding task once.

It should be understood that, although a target IP core for executing the target task is not deployed on the computing platform, an IP core for executing another computational task is deployed on the computing platform. For each deployed IP core, usage $$E_i = \frac{N_2^i \cdot T_2^i}{T_L}$$

of each IP core reflects a usage status of each IP core. An average of usage of all IP cores deployed on the platform can reflect overall usage of the deployed IP cores on the whole, and also indirectly reflect the usage of the reconfigurable resource of the heterogeneous multi-core reconfigurable computing platform. In this embodiment of the present invention, the average of the usage of all the IP cores deployed on the platform is determined as the usage $E_{ave}$ of the reconfigurable resource of the heterogeneous multi-core reconfigurable computing platform, which can represent a usage status of the reconfigurable resource of the computing platform.

S113: Determine the execution manner of the target task according to the weighted popularity $C_w$ of the target task and the usage $E_{ave}$ of the reconfigurable resource.

Specifically, the execution manner of the target task may be determined by comparing values of the weighted popularity $C_w$ of the target task and the usage $E_{ave}$ of the reconfigurable resource.

Optionally, in this embodiment of the present invention, S113 of determining the execution manner of the target task according to the weighted popularity $C_w$ of the target task and the usage $E_{ave}$ of the reconfigurable resource includes:

S113A: When it is determined that the weighted popularity $C_w$ of the target task is greater than or equal to a product of $E_{ave}$ and k, determine that the execution manner of the target task is the hardware manner, where k is a reconfiguration coefficient of the heterogeneous multi-core reconfigurable computing platform, and is used to indicate a reconfiguration overhead of the heterogeneous multi-core reconfigurable computing platform.

S113B: When it is determined that the weighted popularity $C_w$ of the target task is less than a product of $E_{ave}$ and k, determine that the execution manner of the target task is the software manner.

Specifically, the reconfiguration coefficient k of the heterogeneous multi-core reconfigurable computing platform reflects the reconfiguration overhead of the system, where a larger k indicates a lower reconfiguration frequency allowable by the system, and a smaller k indicates a higher reconfiguration frequency allowable by the system. Optionally, the reconfiguration coefficient k may be set according to a reconfiguration speed of the reconfigurable resource of the computing platform and a size of a reconfigured IP core, where the size of the IP core refers to a quantity of reconfigurable resources occupied by the IP core.

It should be understood that the weighted popularity $C_w$ of the target task may be considered as usage of the reconfigurable resource for the target task within the time length $T_L$ if the target task is executed in the hardware manner, where the target task has been executed in the software manner for multiple times. The product of $E_{ave}$ and k represents actual usage of the reconfigurable resource. Therefore, when $C_w$ is greater than or equal to the product of $E_{ave}$ and k, it indicates that the reconfigurable resource is not fully used at the current time point. That is, an IP core deployed on the computing platform is not fully used currently; therefore, it is required to improve the usage of the reconfigurable resource, and IP core reconfiguration needs to be performed, for example, an IP core with lowest usage on the computing platform is reconfigured to be the target IP core for executing the target task. It can be understood that, when $C_w$ is less than the product of $E_{ave}$ and k, it indicates that the reconfigurable resource is used relatively fully at the current time point, that is, an IP core deployed on the computing platform is also used relatively fully. In this case, if a corresponding target IP core is deployed for the target task, the usage of the reconfigurable resource decreases instead. Therefore, when it is determined that the weighted popularity $C_w$ of the target task is less than the product of $E_{ave}$ and k, it is determined that the execution manner of the target task is the software manner, so that the target task is still executed based on a CPU.

In conclusion, in this embodiment of the present invention, an execution status of a target task is determined according to an execution status (popularity) of the to-be-executed target task and a usage status (usage) of a reconfigurable resource of a computing platform. Therefore, usage of the reconfigurable resource can be effectively improved, and system performance can be improved.

Optionally, in this embodiment of the present invention, the heterogeneous multi-core reconfigurable computing platform includes multiple reconfigurable resource packages. In a case in which it is determined that the execution manner of the target task is the hardware manner, S120 of executing the target task according to the determined execution manner includes:

S121: Reconfigure at least one reconfigurable resource package in the multiple reconfigurable resource packages to be the target IP core for executing the target task.

Figure 5:
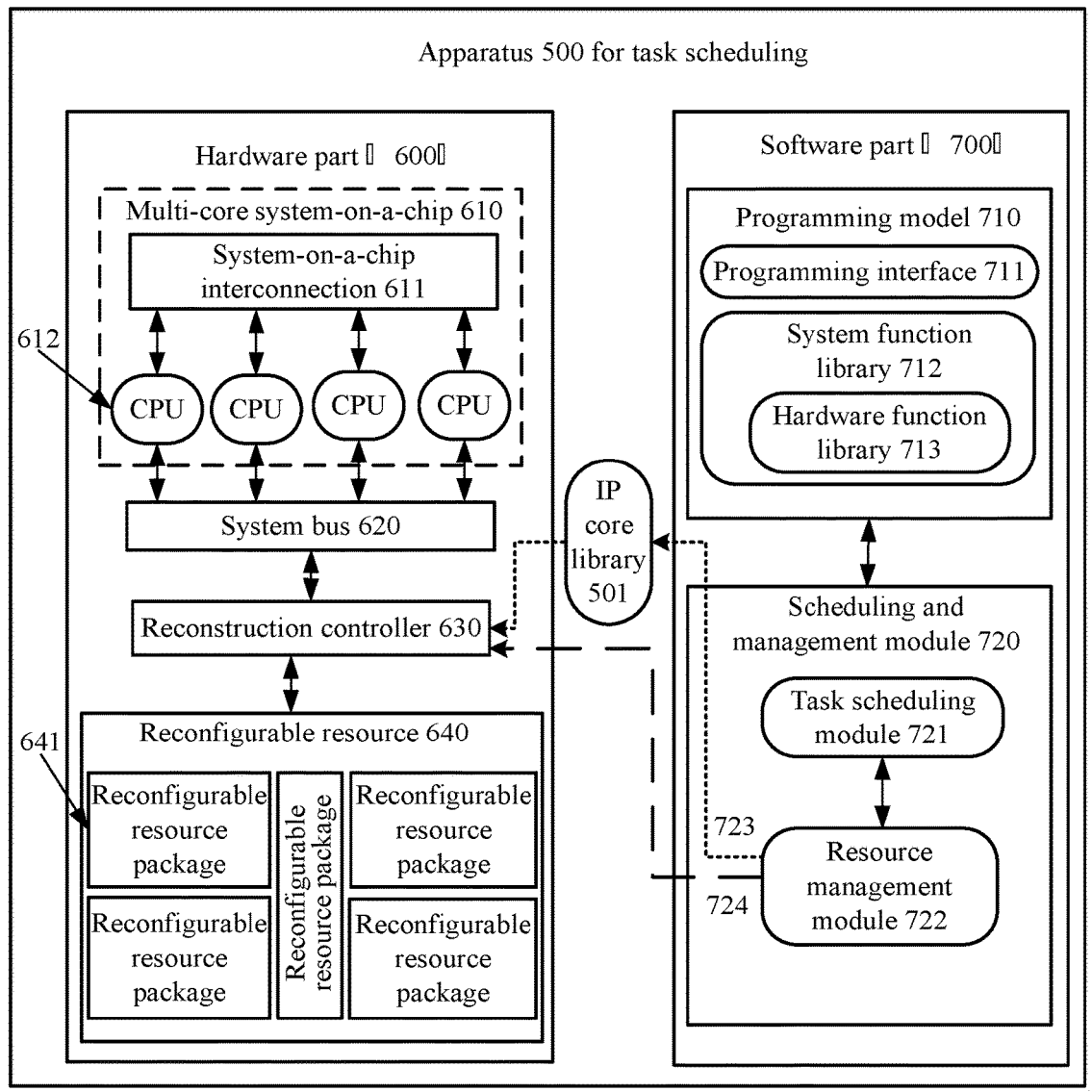
FIG. 5 shows a schematic block diagram of an apparatus for task scheduling on a heterogeneous multi-core reconfigurable computing platform according to an embodiment of the present invention.

Specifically, as shown in FIG. 5, a reconfigurable resource 640 on the heterogeneous multi-core reconfigurable computing platform is managed in a manner of reconfigurable resource packages 641. After the system is started, an IP core that may be deployed on each reconfigurable resource package can be changed dynamically, that is, a function that can be implemented by each reconfigurable resource package changes dynamically. In a process of the change, function replacement is implemented mainly by reorganizing a reconfigurable logical unit (such as a lookup table). Reconfigurable resource packages and functions meet a many-to-many mapping relationship. One reconfigurable resource package may be deployed as IP cores with different functions, and a same function may be deployed on different reconfigurable resource packages. Detailed description is provided with reference to FIG. 6 in the following.

Specifically, a deployment process of the target IP core is represented as: a process in which a hardware logical resource (namely, the reconfigurable resource) is organized into a functional module (which can execute the target task).

S122: Execute the target task by using the target IP core.

In a case in which it is determined that the execution manner of the target task is hardware execution, the target task may also be referred to as a hardware task.

It should be understood that, in this embodiment of the present invention, the hardware task (for example, the target task) is executed by using the target IP core. A specific implementation process is that the heterogeneous multi-core reconfigurable computing platform controls the target IP core, provides input of the hardware task for the target IP core to drive a hardware circuit so as to achieve an objective of executing the hardware task, and generates output.

Optionally, in this embodiment of the present invention, S121 of reconfiguring the at least one reconfigurable resource package in the multiple reconfigurable resource packages to be the target IP core that is capable of executing the target task includes:

S121A: Reconfigure a target reconfigurable resource package in the multiple reconfigurable resource packages to be the target IP core, where the target reconfigurable resource package is a reconfigurable resource package with a longest idle time in the multiple reconfigurable resource packages.

The reconfigurable resource is organized in a manner of the reconfigurable resource packages, that is, all IP cores have a uniform external interface and all the IP cores can be replaced with each other. In an IP core replacement policy, a least-recently-used replacement principle is used. Assuming that a time at which each IP core completes execution last time is T1 and a current time is T2, an idle time of the IP core is T2–T1. When IP core replacement is to be performed, an IP core with a longest idle time T2–T1 is selected to perform replacement.

Specifically, assuming that the time at which a reconfigurable resource package K executes reconfiguration last time is s T1 and the current time is T2, an idle time of the reconfigurable resource package K is defined as T2–T1. In S121A, the reconfigurable resource package with the longest idle time is selected to perform reconfiguration of the target IP core.

Optionally, in this embodiment of the present invention, the method 100 further includes:

S130: Determine a to-be-executed task.

S140: In a case in which an IP core for executing the to-be-executed task is not deployed on the heterogeneous multi-core reconfigurable computing platform, determine the to-be-executed task as the to-be-executed target task.

Specifically, for example, the system includes an IP core deployment status information table, where the status information table records configuration information of a deployed IP core, and it can be determined, according to the configuration information, whether an IP core is deployed for the to-be-executed task. If configuration information of the IP core that is capable of executing the task is found in the IP core deployment status information table, it is considered that an IP core for executing the to-be-executed task is deployed on the heterogeneous multi-core reconfigurable computing platform. If configuration information of the IP core that is capable of executing the task is not found in the IP core deployment status information table, it is considered that an IP core for executing the to-be-executed task is not deployed on the heterogeneous multi-core reconfigurable computing platform.

It should be understood that the to-be-executed task involved in S130 refers to a computational task that is to be executed at the current time point. The target task in this embodiment of the present invention may be the same as the to-be-executed task, which is not limited in this embodiment of the present invention.

Optionally, in this embodiment of the present invention, the method 100 further includes:

S150: In a case in which an IP core for indicating the to-be-executed task is deployed on the heterogeneous multi-core reconfigurable computing platform, determine that an execution manner of the to-be-executed task is hardware execution.

Specifically, as shown in FIG. 2, FIG. 2 shows another schematic flowchart of a method for task scheduling on a heterogeneous multi-core reconfigurable computing platform according to an embodiment of the present invention. The method can be executed, for example, by a computing platform (for example, the computing platform may be a computer). As shown in FIG. 2, in S21, a system is initialized, specifically, including initialization of a function library in the system, where the function library includes a hardware function as well as a software function. The system uses an IP core as a speedup ratio component, provides an interface for invoking the IP core, and encapsulates the software function and the hardware function into a library. System initialization information includes the following information: a set of IP cores that can be deployed in the system, an execution time for an IP core of each type, and a hardware speedup ratio of a task of each type. In S22, a task A to be executed currently is determined. In S23, it is determined whether an IP core for executing the task A is deployed on the heterogeneous multi-core reconfigurable computing platform. If an IP core for executing the task A is deployed on the heterogeneous multi-core reconfigurable computing platform, go to S24; or if an IP core for executing the task A is not deployed on the heterogeneous multi-core reconfigurable computing platform, go to S25. In S25, it is determined whether weighted popularity Cw of the task A is greater than or equal to a product of usage $E_{ave}$ of a reconfigurable resource and a reconfiguration coefficient k. If yes, go to S26; or if no, go to S27. In S26, a corresponding IP core is deployed for the task A. That is, an IP core that is capable of executing the task A is reconstructed according to the reconfigurable resource. In S24, it is determined that an execution manner of the task A is a hardware execution manner. In S27, it is determined that an execution manner of the task A is a software execution manner.

It should be understood that the system involved in this embodiment of the present invention refers to a computing system corresponding to the heterogeneous multi-core reconfigurable computing platform.

It should be further understood that, in the flowchart shown in FIG. 2, after S24, S29 of executing the task A in the hardware manner is further included. That is, the IP core deployed for the task A in S26 is used to execute the task A. After S27, S28 of executing the task A in the software manner is further included. A specific execution method of the task A may be performed according to a corresponding execution means. For example, if the hardware execution manner is used, a processor needs to send, to a corresponding IP core (namely, the IP core that is capable of executing the task A), only input data and a starting signal by using an interconnection module, and the IP core automatically starts execution. After completing the execution, the IP core returns a result to the processor by using the interconnection module.

In S29, specifically, a hardware version of the task A is created by invoking a library function, hardware version data is sent to the IP core corresponding to the task A, and after completing the task A, the corresponding IP core returns the result in an interruption manner.

In S23, if it is determined that the IP core for the task A is deployed on the heterogeneous multi-core reconfigurable computing platform, go to S24 to determine that the hardware manner is used to execute the task A. It should be understood that a reason is that an execution speed of the IP core is far higher than a computation speed of a general purpose processor.

The process, shown in FIG. 2, in which the execution manner of the task A is determined according to a historical execution status (popularity) of the task A and a usage status of the reconfigurable resource may be referred to as a process of task dynamic determining, and a specific process may be referred to as task dynamic binding. Specifically, the dynamic task binding may be understood as dynamically determining, in an operating process of the system, an execution unit for implementing a task of a function. The execution unit may be a general purpose processor, or may be an IP core. For example, in FIG. 2, in S27 of determining that the execution manner of the task A is the software execution, that is, it is determined that the execution unit for completing the task A is the general purpose processor. In S24 of determining that the execution manner of the task A is hardware execution, that is, it is determined that the execution unit for completing the task A is the IP core.

It should be understood that the target task in this embodiment of the present invention may be specifically the task A in FIG. 2.

In conclusion, in this embodiment of the present invention, in a process of determining an execution manner of a target task, a current status of a system, namely, a usage status of a reconfigurable resource, and an execution status of the target task are considered comprehensively, so that a problem existing in the prior art that a reconfigurable resource is used inappropriately is resolved, and therefore, overall performance of the system can be improved.

In a current technology, a heterogeneous multi-core reconfigurable computing platform generally uses a window-based (Window) method for task migration to perform reconfiguration. A window is defined as a time interval between current reconfiguration and next reconfirmation. A window includes three phases: a hardware execution (Hardware Execution) time, a scheduling (Scheduling) time, and a reconfiguration (Reconfiguration) time, where the scheduling time is hidden in the hardware execution time. In the current technology, a size of a reconfiguration window is fixed, and the size of the window affects system performance. For example, an excessively large window causes a reconfigurable resource to be in an idle state for a long period of time, which lowers resource usage and system performance; while an excessively small window causes excessively frequent system reconfiguration, thereby introducing extra reconfiguration overheads and lowering system performance.

In addition, in the prior art, an interface specified by a user is also provided. That is, for a to-be-executed computational task, whether the task is specifically executed in a software manner or executed in a hardware manner is determined according to an execution manner specified by the user for the task. Assuming that the user specifies that the task is to be executed in the hardware manner, if the task already exists on a reconfigurable resource in a form of a hardware module, the task is executed after the hardware module is idle; otherwise, a hardware module of the task is reconfigured according to a reconfigurable resource in a system. If there are insufficient reconfigurable resources for reconfiguration in the system currently, reconfiguration is performed only when there are sufficient reconfiguration resources. It can be learned that, in the prior art, a user specifies an execution manner of a task, which cannot implement comprehensive utilization of system information, and causes that it is not easy to select a most appropriate computation unit (namely, an execution manner) for each task, thereby resulting in low resource usage of a system. A reconfiguration time is, to a great extent, determined by the user. If a manner specified by the user is inappropriate, not only frequent reconfiguration is caused in the system, but also some tasks are kept in a wait state for a long period of time, which affects efficiency of the system.

However, in this embodiment of the present invention, an execution manner of a target task is determined according to an execution status of the to-be-executed target task and a usage status of a reconfigurable resource on a heterogeneous multi-core reconfigurable computing platform, that is, a system dynamic determining manner is used to determine an execution manner of the target task relatively appropriately. Therefore, usage of the reconfigurable resource can be improved, and further overall system performance of the computing platform can be improved.

In the foregoing, with reference to FIG. 1 and FIG. 2, description is provided for the solution, provided in the embodiments of the present invention, in which an execution manner of a target task is determined according to an execution status of the target task and a usage status of a reconfigurable resource on a heterogeneous multi-core reconfigurable computing platform.

Optionally, in the embodiments of the present invention, an execution manner of a target task may be determined according to a user instruction. Specifically, a related interface is provided for the user, and for the to-be-executed target task, the user may specify, by using related code, whether the target task is executed in a hardware manner or executed in a software manner.

Figure 3:
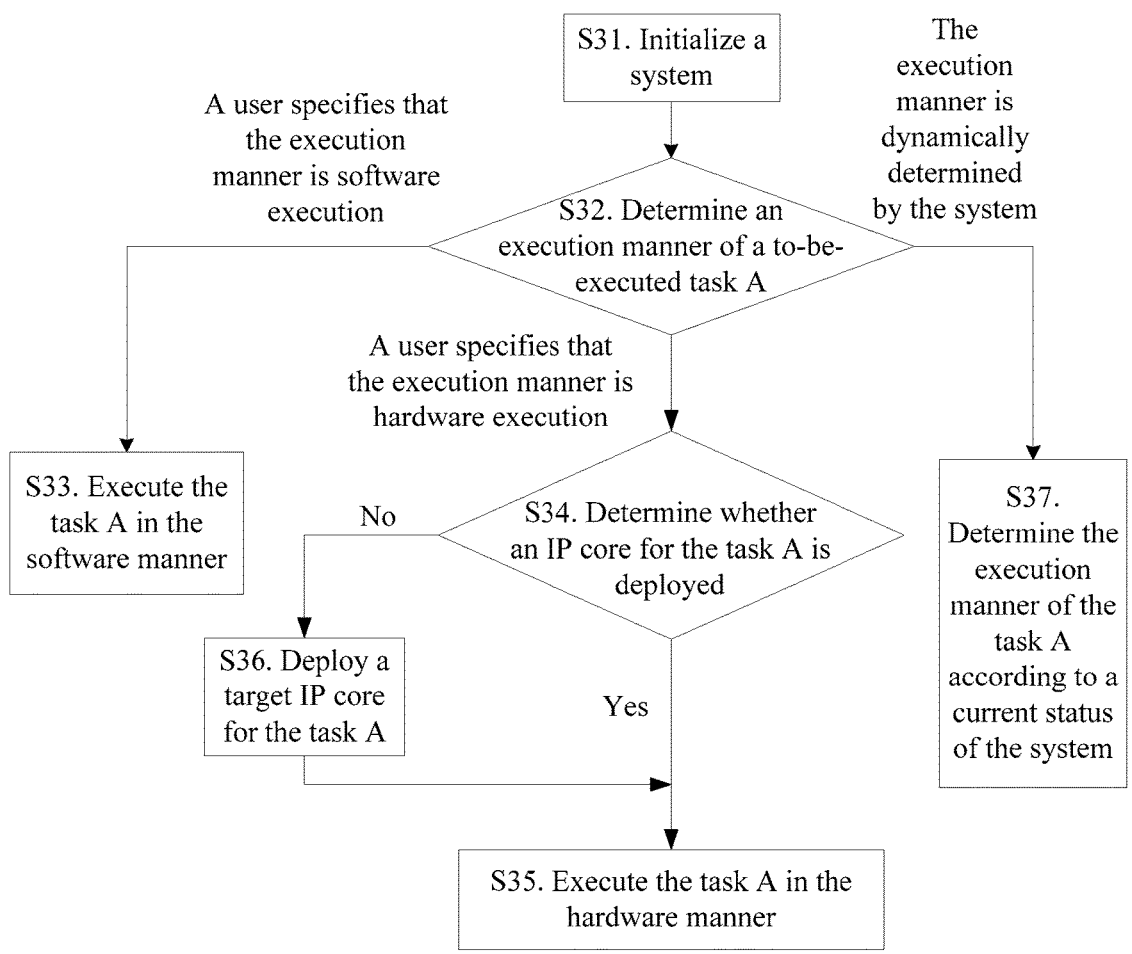
FIG. 3 shows still another schematic flowchart of a method for task scheduling on a heterogeneous multi-core reconfigurable computing platform according to an embodiment of the present invention.

FIG. 3 shows another schematic flowchart of a method for task scheduling on a heterogeneous multi-core reconfigurable computing platform according to an embodiment of the present invention. The method can be executed, for example, by a computing platform (for example, the computing platform may be a computer). As shown in FIG. 3, in S31, a system is initialized, which is similar to S21 in FIG. 2 specifically, and details are not described again. In S32, an execution manner of a to-be-executed task A is determined. If it is determined that the execution manner is software execution that is specified by a user, go to S33; or if it is determined that the execution manner is hardware execution that is specified by a user, go to S34; or if it is determined that a manner of system dynamic determining (the method shown in FIG. 2) is used to determine the execution manner of the task A, go to S37. In S33, when a user specifies that the execution manner of the task A is the software execution, a library function is invoked to create a software version of the task A, so as to execute the task A in the software manner. In S34, it is determined whether an IP core for executing the task A is deployed on the computing platform. If an IP core for executing the task A is deployed on the computing platform, go to S35; or if an IP core for executing the task A is not deployed on the computing platform, go to step S36. In S36, a corresponding IP core is deployed for the task A. Specifically, at least one reconfigurable resource package in multiple reconfigurable resource packages on the heterogeneous multi-core reconfigurable computing platform is reconfigured to be the IP core that is capable of executing the task A. In S35, when it is determined that a corresponding IP core is deployed for the task A, the corresponding IP core is used to execute the task A. In S37, the execution manner of the task A is determined in a manner of system dynamic determining. For specific steps, refer to description of S23 to S29 shown in FIG. 2, and details are not described herein again.

In S35, specifically, a hardware version of the task A is created by invoking a library function, hardware version data is sent to the IP core corresponding to the task A, and after completing the task A, the corresponding IP core returns a result in an interruption manner.

It should be understood that the target task in this embodiment of the present invention may be specifically the task A in FIG. 3.

In this embodiment of the present invention, in a process of determining an execution manner of a target task, two options are provided. One option is that a user specifies the execution manner, where the user can autonomously select a hardware manner or a software manner to execute the target task. The other option is system dynamic determining, where the execution manner is determined according to a current status of a system. Specifically, the execution manner of the target task is determined according to popularity of the task and usage of a reconfigurable resource. Therefore, the usage of the reconfigurable resource of the heterogeneous multi-core reconfigurable computing platform can be effectively improved, and further performance of the computing platform can be improved.

Figure 4:
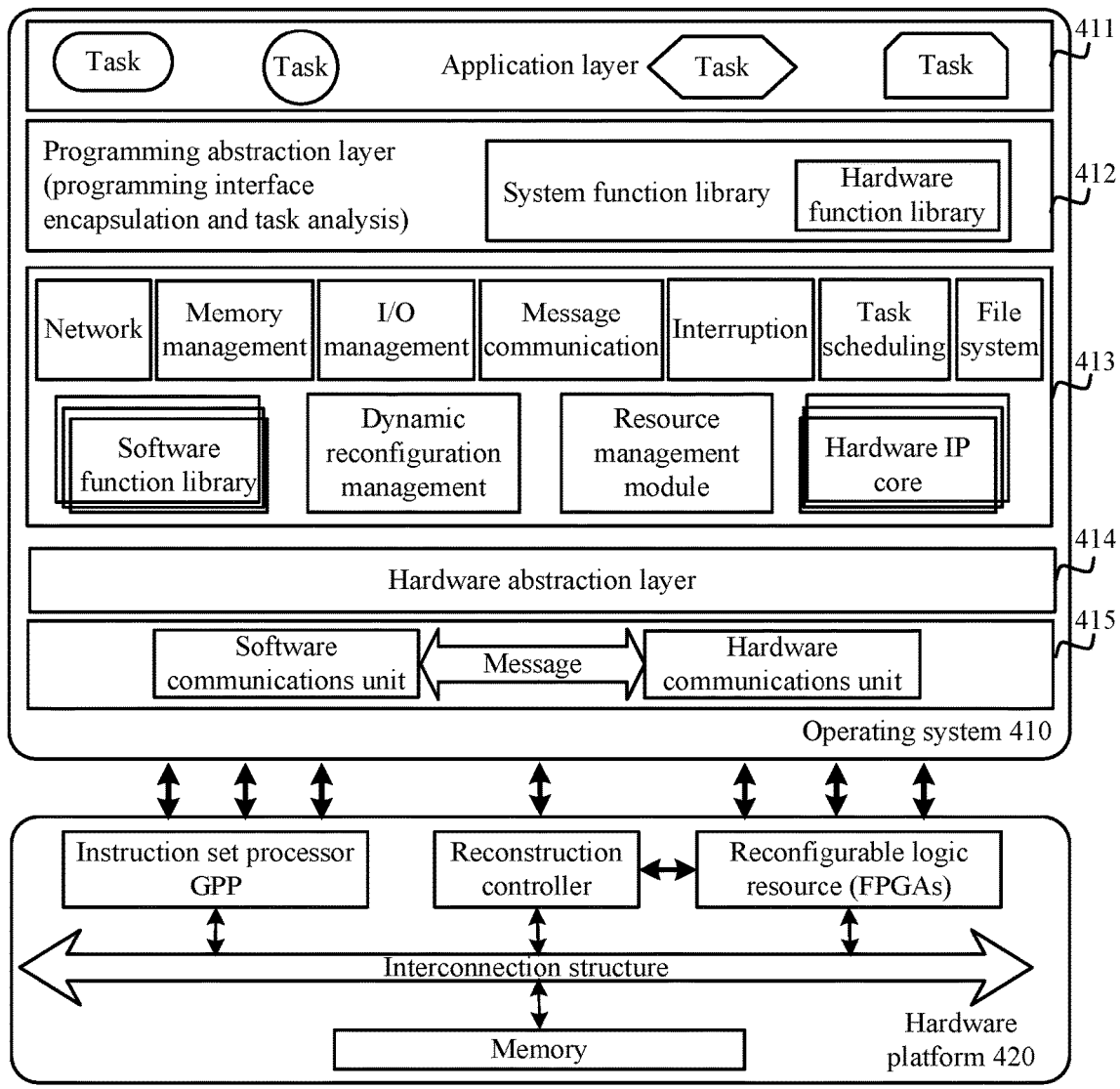
FIG. 4 shows a schematic block diagram of a system architecture involved in an embodiment of the present invention.

The heterogeneous multi-core reconfigurable computing platform involved in this embodiment of the present invention is a heterogeneous and reconfigurable computer processor (platform). The processor, in a broad sense, refers to a processor integrating a general purpose processor and an FPGA programmable logic array, where the FPGA features hardware reconfigurability. FIG. 4 shows a diagram of a system architecture involved in an embodiment of the present invention. As shown in FIG. 4, a system architecture 400 includes two parts: a software operating system 410 and a hardware platform 420.

The operating system 410 from top down may be divided into an application layer 411, a programming abstraction layer 412, a middleware layer 413, a hardware abstraction layer 414, and a communication layer 415. First, the application layer 411 uses an encapsulation interface provided by the programming abstraction layer 412 to invoke an application program. The middleware layer 413 is responsible for work related to aspects, such as system virtualization, distribution, and flexibility, which covers core functions of the operating system 410. The operating system 410 can be responsible for processing a hardware task as well as a software task, where the hardware task and the software task are abstracted together by using the hardware abstraction layer, and interact with the hardware platform by using the communication layer.

The hardware platform 420 includes components, such as a general purpose instruction set processor GPP, a reconfiguration controller, a reconfigurable logic resource, an interconnection structure, and a memory, where the interconnection structure connects a multi-core system and a peripheral device, for example a memory and a hard disk.

Application scenarios of the heterogeneous multi-core reconfigurable computing platform involved in this embodiment of the present invention include an embedded device, a server device, and the like.

FIG. 5 shows a schematic block diagram of an apparatus 500 for task scheduling on a heterogeneous multi-core reconfigurable computing platform according to an embodiment of the present invention. As shown in FIG. 5, a structure of the apparatus 500 for task scheduling on the heterogeneous multi-core reconfigurable computing platform is divided into two main parts: a hardware part 600 and a software part 700. The hardware part 600 includes parts, such as a multi-core system-on-a-chip 610, a system bus 620, a reconfiguration controller 630, and a reconfigurable resource 640.

The multi-core system-on-a-chip 610 includes an on-chip interconnection structure 611 and a multi-core central processing unit (CPU) 612, where the multi-core system-on-a-chip 610 is an execution carrier of a software task.

The system bus 620 connects the multi-core system and a peripheral device, for example, a memory and a hard disk.

The reconfiguration controller 630 receives a reconfiguration control signal 723 and a reconfiguration data signal 724, and performs a reconfiguration operation on a reconfigurable resource according to the reconfiguration control signal 723 and the reconfiguration data signal 724, where the reconfiguration controller 630 is a device closely related to the reconfiguration platform.

The reconfigurable resource 640 is divided into different reconfigurable resource packages 641, where each reconfigurable resource package 641 may be served as an independent device for use. The reconfigurable resource 640 is specifically an FPGA.

The reconfigurable resource 640 is managed in a manner of reconfigurable resource packages, where deployment of the reconfigurable resource packages is fixed after the system is started each time, and modification is not allowed. After the system is started, an IP core that may be deployed on each reconfigurable resource package can be changed dynamically, that is, a function that can be implemented by each reconfigurable resource package changes dynamically. Reconfigurable resource packages and functions meet a many-to-many mapping relationship. One reconfigurable resource package may be deployed as IP cores with different functions, and a same function may be deployed on different reconfigurable resource packages.

The software part 700 includes two parts: a programming model 710 and a scheduling and resource management module 720.

The programming model 710 includes a programming interface 711 and a system function library 712, provides the programming interface 711 for a user, and creates a task by using the system function library 712.

A hardware function library 713 in the system function library 712 is peculiar to the reconfigurable platform, where the hardware function library 713 defines an interface for invoking the reconfigurable resource packages 641 on the reconfigurable resource 640. The hardware function library 713 of the system includes only a functional interface. A mapping relationship between the reconfigurable resource packages 641 and functions is completely transparent to a programmer, and the scheduling and resource management module 720 in the system is responsible for dynamic management performed when the system is operating.

The scheduling and resource management module 720 includes two sub-parts: a task scheduling module 721 and a resource management module 722.

The task scheduling module 721 is configured to determine a task execution time, and determine an execution unit of a task.

The resource management module 722 is configured to manage, according to a result determined by the task scheduling module 721, the reconfigurable resource 640 by using the reconfiguration control signal 723 and the reconfiguration data signal 724, where the reconfiguration control signal 723 refers to a trigger signal for controlling a reconfiguration status and a reconfiguration procedure, and the reconfiguration data signal 724 is a signal indicating a specific function required to be configured for the reconfigurable resource.

Configuration information of an IP core that can be deployed on each reconfigurable resource package 641 in the reconfigurable resource 640 is stored in an IP core library 501, and its representation form is a netlist, a gate circuit, or the like. The IP core library 501 provides, for the reconfiguration controller 630 according to the received reconfiguration data signal 724, configuration information required for deploying an IP core.

In this embodiment of the present invention, the task scheduling module 721 is configured to:

determine an execution manner of a target task according to popularity of the to-be-executed target task and usage of a reconfigurable resource of the heterogeneous multi-core reconfigurable computing platform, where the execution manner includes a hardware manner or a software manner, for the target task, there is no corresponding target intellectual property IP core for executing the target task on the heterogeneous multi-core reconfigurable computing platform, the popularity of the target task is used to indicate central processing unit CPU usage of the target task, and the usage of the reconfigurable resource is used to indicate a usage status of the reconfigurable resource.

Optionally, in this embodiment of the present invention, the task scheduling module 721 is specifically configured to:

determine weighted popularity $C_w$ of the target task according to the popularity of the target task, where $C_w = C \cdot S$, is the popularity of the target task, $C = N_1 \cdot T_1 / T_L$, $T_L$ is a time length between a current time point and a time point at which reconfiguration is performed on the reconfigurable resource last time, $N_1$ is a quantity of times for which the target task is executed within $T_L$ in the software manner, $T_1$ is a time length required for a single execution of the target task in the software manner, S is a hardware speedup ratio of the target task, and the hardware speedup ratio S is used to indicate a ratio between a corresponding execution speed at which the target task is executed in the hardware manner and a corresponding execution speed at which the target task is executed in the software manner;

determine the usage $E_{ave}$ of the reconfigurable resource of the heterogeneous multi-core reconfigurable computing platform according to the following formulas:

$$E_{ave} = \frac{\sum_{i=1}^{M} E_i}{M}$$

$$E_i = \frac{N_2^i \cdot T_2^i}{T_L} \quad (i = 1, 2, \ldots, M),$$

where M is a quantity of IP cores deployed on the heterogeneous multi-core reconfigurable computing platform, $E_i$ is IP core usage of an $i^{th}$ IP core in the M IP cores deployed on the heterogeneous multi-core reconfigurable computing platform, $T_L$ is the time length between the current time point and the time point at which reconfiguration is performed on the reconfigurable resource last time, $N_2^i$ is a quantity of times for which the $i^{th}$ IP core executes a task corresponding to the $i^{th}$ IP core within the time length $T_L$, and $T_2^i$ is a time length required for the $i^{th}$ IP core to execute the corresponding task once; and determine the execution manner of the target task according to the weighted popularity $C_w$ of the target task and the usage $E_{ave}$ of the reconfigurable resource.

Optionally, in this embodiment of the present invention, in terms of determining the execution manner of the target task according to the weighted popularity $C_w$ of the target task and the usage $E_{ave}$ of the reconfigurable resource, the task scheduling module 721 is specifically configured to:

the determining the execution manner of the target task according to the weighted popularity $C_w$ of the target task and the usage $E_{ave}$ of the reconfigurable resource includes:

when it is determined that the weighted popularity $C_w$ of the target task is greater than or equal to a product of $E_{ave}$ and k, determine that the execution manner of the target task is the hardware manner, where k is a reconfiguration coefficient of the heterogeneous multi-core reconfigurable computing platform, and is used to indicate a reconfiguration overhead of the heterogeneous multi-core reconfigurable computing platform; or when it is determined that the weighted popularity $C_w$ of the target task is less than a product of $E_{ave}$ and k, determine that the execution manner of the target task is the software manner.

Optionally, in this embodiment of the present invention, the task scheduling module 721 is further configured to:

determine a to-be-executed task; and when an IP core for executing the to-be-executed task is not deployed on the heterogeneous multi-core reconfigurable computing platform, determine the to-be-executed task as the to-be-executed target task.

Optionally, in this embodiment of the present invention, the task scheduling module 721 is further configured to:

when an IP core for indicating the to-be-executed task is deployed on the heterogeneous multi-core reconfigurable computing platform, determine that the execution manner of the to-be-executed task is hardware execution.

Optionally, in this embodiment of the present invention, when a determining result determined by the task scheduling module 721 is that the execution manner of the target task is hardware execution, the resource management module 722 is configured to manage, according to the result determined by the task scheduling module 721, the reconfigurable resource 640 by using the reconfiguration control signal 723 and the reconfiguration data signal 724. Specifically, the reconfiguration control signal 723 and the reconfiguration data signal 724 are sent to the reconfiguration controller 630.

The reconfiguration controller 630 is configured to perform a reconfiguration operation on the reconfigurable resource 640 according to the received reconfiguration control signal 723 and reconfiguration data signal 724. Specifically, at least one reconfigurable resource package in the multiple reconfigurable resource packages 641 in the reconfigurable resource 640 is reconfigured to be the target IP core for executing the target task.

The multi-core central processing unit 612 (for example, a microprocessor or a single-chip microcomputer) in the multi-core system-on-a-chip 610 sends related processing data of a target task to the target IP core, where the target IP core automatically starts to execute the target task (which may also be referred to as a hardware task). After completing execution of the target task, the target IP core returns a processing result to the processor.

Optionally, in this embodiment of the present invention, the reconfiguration controller 630 is specifically configured to: reconfigure a target reconfigurable resource package in the multiple reconfigurable resource packages to be the target IP core, where the target reconfigurable resource package is a reconfigurable resource package with a longest idle time in the multiple reconfigurable resource packages.

Optionally, in this embodiment of the present invention, when a determining result determined by the task scheduling module 721 is that the execution manner of the target task is software execution, the software part 700 is configured to enable, by means of programming, the processor (for example, a CPU) to have a corresponding processing function, so as to complete the target task by using software.

The reconfigurable resource 640 is managed in a manner of the reconfigurable resource packages 641, where deployment of the reconfigurable resource packages 641 is fixed after the system is started each time, and modification is not allowed. After the system is started, an IP core that may be deployed on each reconfigurable resource package 641 can be changed dynamically, that is, a function that can be implemented by each reconfigurable resource package 641 changes dynamically. In a process of the change, function replacement is implemented mainly by reorganizing a reconfigurable logical unit (such as a lookup table). The reconfigurable resource packages 641 and functions meet a many-to-many mapping relationship. One reconfigurable resource package 641 may be deployed as IP cores with different functions, and a same function may be deployed on different reconfigurable resource packages 641.

Figure 6:
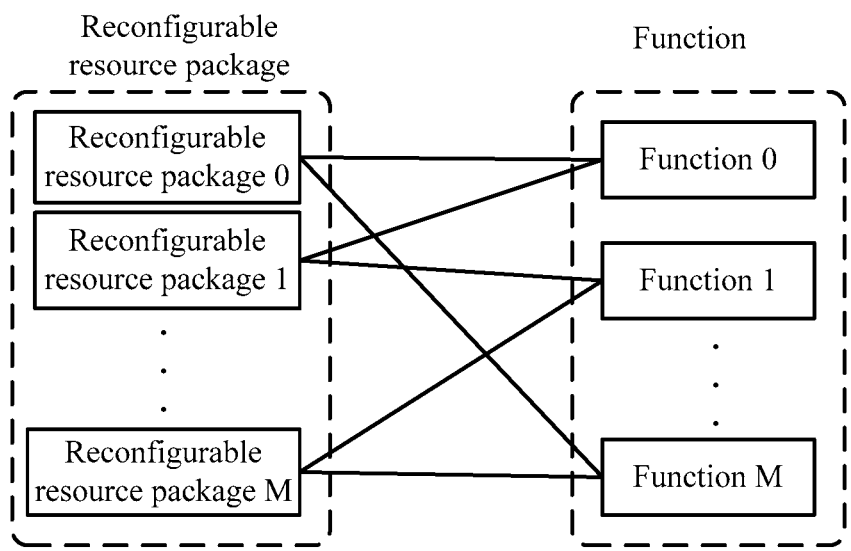
FIG. 6 shows a schematic diagram of reconfigurable resource packages involved in an embodiment of the present invention.

Specifically, as shown in FIG. 6, the reconfigurable resource packages 641 shown in FIG. 5 may be deployed as the IP cores with different functions, and the same function may be deployed on different reconfigurable resource packages. For example, assuming that the reconfigurable resource on the computing platform is divided into three reconfigurable resource packages, where numbers thereof are 0, 1, and 2 respectively. The computing platform can execute four functions: a function 1 (an add operation), a function 2 (a subtraction operation), a function 3 (a matrix operation), and a function 4 (video processing). A correspondence between the reconfigurable resource packages and the functions may be represented as: 0 may be corresponding to the function 1 and the function 2, 1 may be corresponding to the function 1 and the function 3, and 2 may be corresponding to the function 1, the function 3, and the function 4. Specifically, a set of reconfigurable resource packages in the system may be set as BbSet, and each element in the set represents a number BbNum of a reconfigurable resource package. A set of functions is set as FunSet, and each element in the set represents a number FunNum of a function. Each function may be corresponding to multiple IP cores in the system. A mapping relationship between BbSet and FunSet is defined as f: BbSet→FunSet, where the mapping relationship f may be represented as a set of 2-tuples <BbNum, FunNum>. The 2-tuples actually represent a correspondence between the reconfigurable resource packages and the IP cores, where the set is defined as IPSet. IPSet determines a design of an IP core library. A set of configuration files in the IP core library is defined as ConfigSet, and each element in the set is one configuration file FileNum. IPset and ConfigSet meet a one-to-one mapping relationship, that is, each 2-tuple <BbNum, FunNum> is corresponding to one FileNum, which is not limited in the present invention, however.

Optionally, before task scheduling is performed, the foregoing mapping relationship between the reconfigurable resource packages and the functions is established. For example, in a system initialization process of the computing platform, the foregoing mapping relationship between the reconfigurable resource packages and the functions is established, which is not limited in this embodiment of the present invention.

A typical application scenario of a method for task scheduling on the heterogeneous multi-core reconfigurable computing platform provided in this embodiment of the present invention is: at an early operating stage of the system (an embedded system or a server), load or a task of the system is allocated, according to a user agreement or planning, to a general purpose processor and an FPGA accelerator, for execution. In an operating process of the system, as the load/task changes, the system determines, according to a current hardware resource and task information, costs and benefits for executing the task by means of hardware execution, and determines whether the task is executed with an acceleration.

Therefore, in this embodiment of the present invention, an execution manner of the target task is determined according to popularity of the target task and usage of a reconfigurable resource of the heterogeneous multi-core reconfigurable computing platform. That is, the execution manner of the target task is determined according to an execution status of the target task and a usage status of the reconfigurable resource, which can implement appropriate use of the reconfigurable resource. With respect to a problem in the prior art that frequent IP core reconfiguration is caused or some tasks are kept in a wait state for a long period of time resulting from a fact that a user specifies an execution manner of a task, the method provided in this embodiment of the present invention can effectively improve usage of a reconfigurable resource, and therefore can effectively improve the overall operating efficiency of a heterogeneous multi-core reconfigurable computing platform.

In this embodiment of the present invention, execution of a software task and a hardware task is transparent to a user. The user only needs to create a task according to a preset rule without the need to concern about how the task is finally executed. Therefore, the method for task scheduling on a heterogeneous multi-core reconfigurable computing platform in this embodiment of the present invention improves usage of computing resources of the heterogeneous multi-core reconfigurable computing platform as well as improving user experience.

Figure 7:
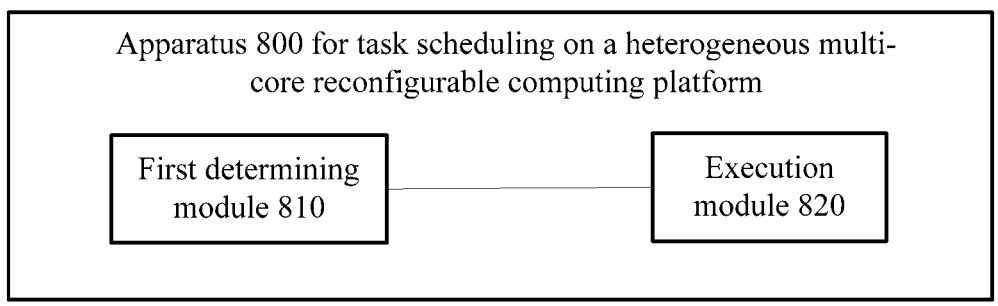
FIG. 7 shows a schematic block diagram of an apparatus for task scheduling on a heterogeneous multi-core reconfigurable computing platform according to an embodiment of the present invention.

FIG. 7 shows a schematic block diagram of an apparatus 800 for task scheduling on a heterogeneous multi-core reconfigurable computing platform according to an embodiment of the present invention. The apparatus 800 includes:

a first determining module 810, configured to determine an execution manner of a target task according to popularity of the to-be-executed target task and usage of a reconfigurable resource of the heterogeneous multi-core reconfigurable computing platform, where the execution manner includes a hardware manner or a software manner, for the target task, there is no corresponding target intellectual property IP core for executing the target task on the heterogeneous multi-core reconfigurable computing platform, the popularity of the target task is used to indicate central processing unit CPU usage of the target task, and the usage of the reconfigurable resource is used to indicate a usage status of the reconfigurable resource; and an execution module 820, configured to execute the target task according to the execution manner determined by the first determining module.

Therefore, in this embodiment of the present invention, an execution manner of the target task is determined according to popularity of the target task and usage of a reconfigurable resource of the heterogeneous multi-core reconfigurable computing platform. That is, the execution manner of the target task is determined according to an execution status of the target task and a usage status of the reconfigurable resource, which can implement appropriate use of the reconfigurable resource. With respect to a problem in the prior art that frequent IP core reconfiguration is caused or some tasks are kept in a wait state for a long period of time resulting from a fact that a user specifies an execution manner of a task, the method provided in this embodiment of the present invention can effectively improve usage of a reconfigurable resource, and therefore can effectively improve the overall operating efficiency of a heterogeneous multi-core reconfigurable computing platform.

Optionally, in this embodiment of the present invention, in terms of determining the execution manner of the target task according to the popularity of the target task and the usage of the reconfigurable resource of the heterogeneous multi-core reconfigurable computing platform, the first determining module 810 is specifically configured to:

determine weighted popularity $C_w$ of the target task according to the popularity of the target task, where $C_w = C \cdot S$, C is the popularity of the target task, $C = N_1 \cdot T_1 / T_L$, $T_L$ is a time length between a current time point and a time point at which reconfiguration is performed on the reconfigurable resource last time, $N_1$ is a quantity of times for which the target task is executed within $T_L$ in the software manner, $T_1$ is a time length required for a single execution of the target task in the software manner, S is a hardware speedup ratio of the target task, and the hardware speedup ratio S is used to indicate a ratio between a corresponding execution speed at which the target task is executed in the hardware manner and a corresponding execution speed at which the target task is executed in the software manner;

determine the usage $E_{ave}$ of the reconfigurable resource of the heterogeneous multi-core reconfigurable computing platform according to the following formulas:

$$E_{ave} = \frac{\sum_{i=1}^{M} E_i}{M}$$

$$E_i = \frac{N_2^i \cdot T_2^i}{T_L} \quad (i = 1, 2, \ldots, M),$$

where M is a quantity of IP cores deployed on the heterogeneous multi-core reconfigurable computing platform, $E_i$ is IP core usage of an $i^{th}$ IP core in the M IP cores deployed on the heterogeneous multi-core reconfigurable computing platform, $T_L$ is the time length between the current time point and the time point at which reconfiguration is performed on the reconfigurable resource last time, $N_2^i$ is a quantity of times for which the $i^{th}$ IP core executes a task corresponding to the $i^{th}$ IP core within the time length $T_L$, and $T_2^i$ is a time length required for the $i^{th}$ IP core to execute the corresponding task once; and determine the execution manner of the target task according to the weighted popularity $C_w$ of the target task and the usage $E_{ave}$ of the reconfigurable resource.

Optionally, in this embodiment of the present invention, in terms of determining the execution manner of the target task according to the weighted popularity $C_w$ of the target task and the usage $E_{ave}$ of the reconfigurable resource, the first determining module 810 is specifically configured to:

when it is determined that the weighted popularity $C_w$ of the target task is greater than or equal to a product of $E_{ave}$ and k, determine that the execution manner of the target task is the hardware manner, where k is a reconfiguration coefficient of the heterogeneous multi-core reconfigurable computing platform, and is used to indicate a reconfiguration overhead of the heterogeneous multi-core reconfigurable computing platform; or when it is determined that the weighted popularity $C_w$ of the target task is less than a product of $E_{ave}$ and k, determine that the execution manner of the target task is the software manner.

Figure 8:
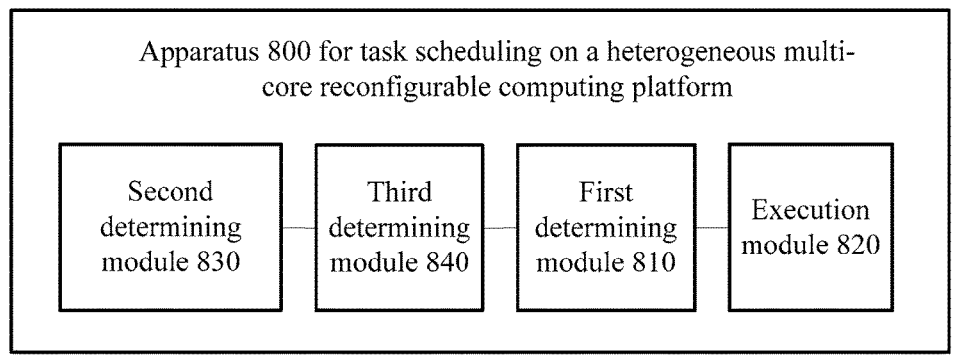
FIG. 8 shows another schematic block diagram of an apparatus for task scheduling on a heterogeneous multi-core reconfigurable computing platform according to an embodiment of the present invention.

Optionally, in this embodiment of the present invention, as shown in FIG. 8, the apparatus 800 further includes:

a second determining module 830, configured to determine a to-be-executed task; and a third determining module 840, configured to: when an IP core for executing the to-be-executed task is not deployed on the heterogeneous multi-core reconfigurable computing platform, determine the to-be-executed task as the to-be-executed target task.

Optionally, in this embodiment of the present invention, the heterogeneous multi-core reconfigurable computing platform includes multiple reconfigurable resource packages, and in terms of executing the target task according to the determined execution manner, the execution module 820 is specifically configured to:

when it is determined that the execution manner of the target task is the hardware manner, reconfigure at least one reconfigurable resource package in the multiple reconfigurable resource packages to be the target IP core for executing the target task; and execute the target task by using the target IP core.

Optionally, in this embodiment of the present invention, in terms of reconfiguring the at least one reconfigurable resource package in the multiple reconfigurable resource packages to be the target IP core that is capable of executing the target task, the execution module 820 is specifically configured to:

reconfigure a target reconfigurable resource package in the multiple reconfigurable resource packages to be the target IP core, where the target reconfigurable resource package is a reconfigurable resource package with a longest idle time in the multiple reconfigurable resource packages.

Optionally, in this embodiment of the present invention, the apparatus 800 further includes:

a fourth determining module 850, configured to: when an IP core for indicating the to-be-executed task is deployed on the heterogeneous multi-core reconfigurable computing platform, determine that an execution manner of the to-be-executed task is hardware execution.

Therefore, in this embodiment of the present invention, an execution manner of the target task is determined according to popularity of the target task and usage of a reconfigurable resource of the heterogeneous multi-core reconfigurable computing platform. That is, the execution manner of the target task is determined according to an execution status of the target task and a usage status of the reconfigurable resource, which can implement appropriate use of the reconfigurable resource. With respect to a problem in the prior art that frequent IP core reconfiguration is caused or some tasks are kept in a wait state for a long period of time resulting from a fact that a user specifies an execution manner of a task, the method provided in this embodiment of the present invention can effectively improve usage of a reconfigurable resource, and therefore can effectively improve the overall operating efficiency of a heterogeneous multi-core reconfigurable computing platform.

It should be understood that the apparatus 800 for task scheduling on a heterogeneous multi-core reconfigurable computing platform in this embodiment of the present invention may be corresponding to the apparatus 500 for task scheduling on a heterogeneous multi-core reconfigurable computing platform in the embodiment of the present invention, and the foregoing and other operations and/or functions of the modules of the apparatus 800 separately implement corresponding procedures of the methods of FIG. 1 to FIG. 3. For brevity, details are not described herein again.

Figure 9:
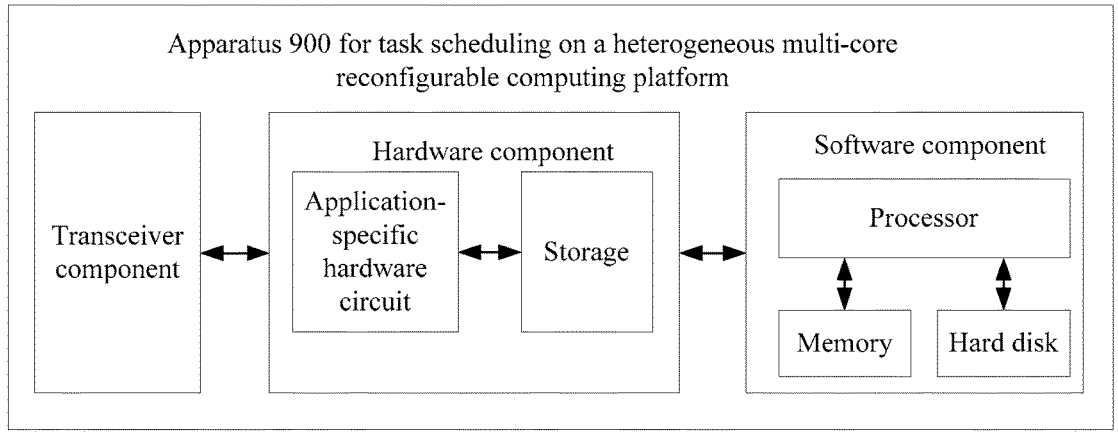
FIG. 9 shows still another schematic block diagram of an apparatus for task scheduling on a heterogeneous multi-core reconfigurable computing platform according to an embodiment of the present invention.

Based on the foregoing embodiments, this embodiment provides a hardware structure of an apparatus 900 for task scheduling on a heterogeneous multi-core reconfigurable computing platform. Referring to FIG. 9, the hardware structure of the apparatus 900 may include:

a transceiver component, a software component, and a hardware component.

The transceiver component is a hardware circuit for implementing package receiving and sending.

The hardware component may also be referred to as a "hardware processing module", or more simply, may be short for "hardware". The hardware component mainly includes a hardware circuit that implements, based on an application-specific hardware circuit such as an FPGA and an ASIC (which may also coordinate with another matching component, for example, a storage), some specific functions, where a processing speed of the hardware component is usually much higher than that of a general-purpose processor, but it is difficult to change a function once the function is customized. Therefore, the hardware component is inflexible in implementation and is generally configured to implement some fixed functions. It should be noted that, in an actual application, the hardware component may also include a processor such as an MCU (a microprocessor, for example, a single-chip microcomputer) or a CPU. However, a main function of these processors is not to complete big data processing, but is mainly to perform control. In this application scenario, a system including these components is a hardware component.

The software component (or short for "software") mainly includes a general purpose processor (for example, a CPU) and some matching components (for example, a storage device such as a memory or a hard disk) of the general purpose processor, where the processor may be enabled, by means of programming, to have a corresponding processing function. When the function is implemented by using software, the software component can be configured flexibly according to a service requirement, but a speed thereof is usually lower than that of the hardware component. After software processing is complete, the hardware component may send processed data by using the transceiver component, or may send processed data to the transceiver component over an interface connected to the transceiver component.

In this embodiment of the present invention, the software component is configured to perform system dynamic determining mentioned in the foregoing embodiment. That is, the software component is configured to:

determine an execution manner of a target task according to popularity of the to-be-executed target task and usage of a reconfigurable resource of the heterogeneous multi-core reconfigurable computing platform, where the execution manner includes a hardware manner or a software manner, for the target task, there is no corresponding target intellectual property IP core for executing the target task on the heterogeneous multi-core reconfigurable computing platform, the popularity of the target task is used to indicate central processing unit CPU usage of the target task, and the usage of the reconfigurable resource is used to indicate a usage status of the reconfigurable resource.

Optionally, in this embodiment of the present invention, the software component is specifically configured to:

determine weighted popularity $C_w$ of the target task according to the popularity of the target task, where $C_w = C \cdot S$, C is the popularity of the target task, $C = N_1 \cdot T_1 / T_L$, $T_L$ is a time length between a current time point and a time point at which reconfiguration is performed on the reconfigurable resource last time, $N_1$ is a quantity of times for which the target task is executed within $T_L$ in the software manner, $T_1$ is a time length required for a single execution of the target task in the software manner, S is a hardware speedup ratio of the target task, and the hardware speedup ratio S is used to indicate a ratio between a corresponding execution speed at which the target task is executed in the hardware manner and a corresponding execution speed at which the target task is executed in the software manner;

determine the usage $E_{ave}$ of the reconfigurable resource of the heterogeneous multi-core reconfigurable computing platform according to the following formulas:

$$E_{ave} = \frac{\sum_{i=1}^{M} E_i}{M}$$

$$E_i = \frac{N_2^i \cdot T_2^i}{T_L} \quad (i = 1, 2, \ldots, M),$$

where M is a quantity of IP cores deployed on the heterogeneous multi-core reconfigurable computing platform, $E_i$ is IP core usage of an $i^{th}$ IP core in the M IP cores deployed on the heterogeneous multi-core reconfigurable computing platform, $T_L$ is the time length between the current time point and the time point at which reconfiguration is performed on the reconfigurable resource last time, $N_2^i$ is a quantity of times for which the $i^{th}$ IP core executes a task corresponding to the $i^{th}$ IP core within the time length $T_L$, $T_2^i$ is a time length required for the $i^{th}$ IP core to execute the corresponding task once; and determine the execution manner of the target task according to the weighted popularity $C_w$ of the target task and the usage $E_{ave}$ of the reconfigurable resource.

Optionally, in this embodiment of the present invention, in terms of determining the execution manner of the target task according to the weighted popularity $C_w$ of the target task and the usage $E_{ave}$ of the reconfigurable resource, the software component is specifically configured to:

when it is determined that the weighted popularity $C_w$ of the target task is greater than or equal to a product of $E_{ave}$ and k, determine that the execution manner of the target task is the hardware manner, where k is a reconfiguration coefficient of the heterogeneous multi-core reconfigurable computing platform, and is used to indicate a reconfiguration overhead of the heterogeneous multi-core reconfigurable computing platform; or when it is determined that the weighted popularity $C_w$ of the target task is less than a product of $E_{ave}$ and k, determine that the execution manner of the target task is the software manner.

Optionally, in this embodiment of the present invention, the heterogeneous multi-core reconfigurable computing platform includes multiple reconfigurable resource packages, where when determining that the execution manner of the target task is the hardware manner, the software component is configured to:

reconfigure at least one reconfigurable resource package in the multiple reconfigurable resource packages to be the target IP core for executing the target task; and the hardware component is configured to:

execute the target task by using the target IP core.

Specifically, for example, a processor (such as a microprocessor or a single-chip microcomputer) included in the hardware component sends processed data, for example, input data and a starting signal, to the target IP core by using a transceiver component, and the target IP core automatically starts to execute the target task (which may also be referred to as a hardware task). After completing execution of the target task, the target IP core returns a processing result to the processor by using the transceiver component.

Optionally, in this embodiment of the present invention, in terms of reconfiguring the at least one reconfigurable resource package in the multiple reconfigurable resource packages to be the target IP core for executing the target task, the software component is specifically configured to:

reconfigure a target reconfigurable resource package in the multiple reconfigurable resource packages to be the target IP core, where the target reconfigurable resource package is a reconfigurable resource package with a longest idle time in the multiple reconfigurable resource packages.

Optionally, in this embodiment of the present invention, when determining that the execution manner of the target task is the software manner, the software component is configured to:

enable, by means of programming, the processor (for example, a CPU) to have a corresponding processing function, so as to complete the target task by using software.

Optionally, in this embodiment of the present invention, the software component is further configured to:

determine a to-be-executed task; and when an IP core for executing the to-be-executed task is not deployed on the heterogeneous multi-core reconfigurable computing platform, determine the to-be-executed task as the to-be-executed target task.

According to the method combining software and hardware in this embodiment, not only a processing speed is ensured, but also flexibility is achieved.

Therefore, in this embodiment of the present invention, an execution manner of the target task is determined according to popularity of the target task and usage of a reconfigurable resource of the heterogeneous multi-core reconfigurable computing platform. That is, the execution manner of the target task is determined according to an execution status of the target task and a usage status of the reconfigurable resource, which can implement appropriate use of the reconfigurable resource. With respect to a problem in the prior art that frequent IP core reconfiguration is caused or some tasks are kept in a wait state for a long period of time resulting from a fact that a user specifies an execution manner of a task, the method provided in this embodiment of the present invention can effectively improve usage of a reconfigurable resource, and therefore can effectively improve the overall operating efficiency of a heterogeneous multi-core reconfigurable computing platform.

It should be understood that the apparatus 900 for task scheduling on a heterogeneous multi-core reconfigurable computing platform in this embodiment of the present invention may be corresponding to the apparatus 500 for task scheduling on a heterogeneous multi-core reconfigurable computing platform in the embodiment of the present invention, or may be corresponding to the apparatus 800 for task scheduling on a heterogeneous multi-core reconfigurable computing platform in the embodiment of the present invention. The foregoing and other operations and/or functions of the components of the apparatus 900 separately implement corresponding procedures of the methods of FIG. 1 to FIG. 3. For brevity, details are not described herein again.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, units and algorithm steps described in the examples with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions to cause a computer device (which may be a personal computer, a server, or a network device) to perform all or some of the steps of the methods described in the embodiments of the present invention. The foregoing storage medium includes: any medium that can store program code, such as a USB flash drive, a portable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for task scheduling on a heterogeneous multi-core reconfigurable computing platform, the method comprising:
    determining an execution manner of a target task, comprising a hardware manner or a software manner, according to popularity of the target task which is to-be-executed and usage of a reconfigurable resource of the heterogeneous multi-core reconfigurable computing platform, including:
        (a) determining whether weighted popularity of the target task is greater than or equal to a product of the usage of the reconfigurable resource and a reconfiguration coefficient when the weighted popularity of the target task is greater than or equal to the product, determining the execution manner is the hardware manner; or
        (b) when the weighted popularity of the target task is less than the product, determining the execution manner is the software manner;
            wherein there is no corresponding target intellectual property (IP) core for executing the target task on the heterogeneous multi-core reconfigurable computing platform, the popularity of the target task indicates central processing unit (CPU) usage of the target task, and the usage of the reconfigurable resource indicates a usage status of the reconfigurable resource; and
    executing the target task according to the determined execution manner.

2. The method according to claim 1, wherein the determining the execution manner of the target task comprises:
    determining weighted popularity $C_w$ of the target task according to the popularity of the target task, where $C_w = C \cdot S$, C is the popularity of the target task, $C = N_1 \cdot T_1 / T_L$, $T_L$ is a time length between a current time point and a time point at which reconfiguration is performed on the reconfigurable resource last time, $N_1$ is a quantity of times for which the target task is executed within $T_L$ in the software manner, $T_1$ is a time length required for a single execution of the target task in the software manner, S is a hardware speedup ratio of the target task, and the hardware speedup ratio S is used to indicate a ratio between a corresponding execution speed at which the target task is executed in the hardware manner and a corresponding execution speed at which the target task is executed in the software manner;
    determining the usage $E_{ave}$ of the reconfigurable resource of the heterogeneous multi-core reconfigurable computing platform according to the following formulas:

$$E_{ave} = \frac{\sum_{i=1}^{M} E_i}{M}$$

$$E_i = \frac{N_2^i \cdot T_2^i}{T_L} \quad (i = 1, 2, \ldots, M),$$

wherein M is a quantity of IP cores deployed on the heterogeneous multi-core reconfigurable computing platform, $E_i$ is IP core usage of an $i^{th}$ IP core in the M IP cores deployed on the heterogeneous multi-core reconfigurable computing platform, $T_L$ is the time length between the current time point and the time point at which reconfiguration is performed on the reconfigurable resource last time, $N_2^i$ is a quantity of times for which the $i^{th}$ IP core executes a task corresponding to the $i^{th}$ IP core within the time length $T_L$, $T_2^i$ is a time length required for the $i^{th}$ IP core to execute the corresponding task once; and
    determining the execution manner of the target task according to the weighted popularity $C_w$ of the target task and the usage $E_{ave}$ of the reconfigurable resource.

3. The method according to claim 2, wherein the determining the execution manner of the target task according to the weighted popularity $C_w$ of the target task and the usage $E_{ave}$ of the reconfigurable resource comprises:
    when it is determined that the weighted popularity $C_w$ of the target task is greater than or equal to a product of $E_{ave}$ and k, determining that the execution manner of the target task is the hardware manner, wherein k is a reconfiguration coefficient of the heterogeneous multi-core reconfigurable computing platform, and is used to indicate a reconfiguration overhead of the heterogeneous multi-core reconfigurable computing platform; or
    when it is determined that the weighted popularity $C_w$ of the target task is less than a product of $E_{ave}$ and k, determining that the execution manner of the target task is the software manner.

4. The method according to claim 1, wherein the method further comprises:
    determining a to-be-executed task; and
    when an IP core for executing the to-be-executed task is not deployed on the heterogeneous multi-core reconfigurable computing platform, determining the to-be-executed task as the to-be-executed target task.

5. The method according to claim 4, wherein the method further comprises:
    when an IP core for executing the to-be-executed task is deployed on the heterogeneous multi-core reconfigurable computing platform, determining that an execution manner of the to-be-executed task is hardware execution.

6. The method according to claim 1, wherein the heterogeneous multi-core reconfigurable computing platform comprises multiple reconfigurable resource packages, and when determining that the execution manner of the target task is the hardware manner, the executing the target task according to the determined execution manner comprises:
reconfiguring at least one reconfigurable resource package in the multiple reconfigurable resource packages to be a target IP core for executing the target task; and
executing the target task by using the target IP core.

7. The method according to claim 6, wherein the reconfiguring the at least one reconfigurable resource package comprises:
reconfiguring a target reconfigurable resource package in the multiple reconfigurable resource packages to be the target IP core, wherein the target reconfigurable resource package is a reconfigurable resource package with a longest idle time in the multiple reconfigurable resource packages.

8. An apparatus for task scheduling on a heterogeneous multi-core reconfigurable computing platform, wherein the apparatus comprises:
a processor, and
a memory which stores processor-executable instructions, which when executed causes the processor to implement the following operations:
determining an execution manner of a target task, comprising a hardware manner or a software manner, according to popularity of the target task which is to-be-executed and usage of a reconfigurable resource of the heterogeneous multi-core reconfigurable computing platform, including:
(a) determining whether weighted popularity of the target task is greater than or equal to a product of the usage of the reconfigurable resource and a reconfiguration coefficient;
(b) when the weighted popularity of the target task is greater than or equal to the product, determining the execution manner is the hardware manner; or when the weighted popularity of the target task is less than the product, determining the execution manner is the software manner;
wherein for the target task, there is no corresponding target intellectual property (IP) core for executing the target task on the heterogeneous multi-core reconfigurable computing platform, the popularity of the target task indicates central processing unit (CPU) usage of the target task, and the usage of the reconfigurable resource indicates a usage status of the reconfigurable resource; and
executing the target task according to the execution manner.

9. The apparatus according to claim 8, wherein in terms of determining the execution manner of the target task, the operations comprise:
determining weighted popularity $C_w$ of the target task according to the popularity of the target task, where $C_w = C \cdot S$, C is the popularity of the target task, $C = N_1 \cdot T_1 / T_L$, $T_L$ is a time length between a current time point and a time point at which reconfiguration is performed on the reconfigurable resource last time, $N_1$ is a quantity of times for which the target task is executed within $T_L$ in the software manner, $T_1$ is a time length required for a single execution of the target task in the software manner, S is a hardware speedup ratio of the target task, and the hardware speedup ratio S is used to indicate a ratio between a corresponding execution speed at which the target task is executed in the hardware manner and a corresponding execution speed at which the target task is executed in the software manner;
determining the usage $E_{ave}$ of the reconfigurable resource of the heterogeneous multi-core reconfigurable computing platform according to the following formulas:

$$E_{ave} = \frac{\sum_{i=1}^{M} E_i}{M}$$

$$E_i = \frac{N_2^i \cdot T_2^i}{T_L} \quad (i = 1, 2, \ldots, M),$$

wherein M is a quantity of IP cores deployed on the heterogeneous multi-core reconfigurable computing platform, $E_i$ is IP core usage of an $i^{th}$ IP core in the M IP cores deployed on the heterogeneous multi-core reconfigurable computing platform, $T_L$ is the time length between the current time point and the time point at which reconfiguration is performed on the reconfigurable resource last time, $N_2^i$ is a quantity of times for which the $i^{th}$ IP core executes a task corresponding to the $i^{th}$ IP core within the time length $T_L$, $T_2^i$ is a time length required for the $i^{th}$ IP core to execute the corresponding task once; and
determining the execution manner of the target task according to the weighted popularity $C_w$ of the target task and the usage $E_{ave}$ of the reconfigurable resource.

10. The apparatus according to claim 9, wherein in terms of determining the execution manner of the target task, the operations comprise:
when it is determined that the weighted popularity $C_w$ of the target task is greater than or equal to a product of $E_{ave}$ and k, determining that the execution manner of the target task is the hardware manner, wherein k is a reconfiguration coefficient of the heterogeneous multi-core reconfigurable computing platform, and is used to indicate a reconfiguration overhead of the heterogeneous multi-core reconfigurable computing platform; or
when it is determined that the weighted popularity $C_w$ of the target task is less than a product of $E_{ave}$ and k, determining that the execution manner of the target task is the software manner.

11. The apparatus according to claim 8, wherein the operations further comprise:
determining a to-be-executed task; and
when an IP core for executing the to-be-executed task is not deployed on the heterogeneous multi-core reconfigurable computing platform, determining the to-be-executed task as the to-be-executed target task.

12. The apparatus according to claim 11, wherein the operations further comprise:
when an IP core for executing the to-be-executed task is deployed on the heterogeneous multi-core reconfigurable computing platform, determining that an execution manner of the to-be-executed task is hardware execution.

13. The apparatus according to claim 8, wherein the heterogeneous multi-core reconfigurable computing platform comprises multiple reconfigurable resource packages, and in terms of executing the target task according to the determined execution manner, the operations comprise:
when it is determined that the execution manner of the target task is the hardware manner, reconfiguring at least one reconfigurable resource package in the multiple reconfigurable resource packages to be a target IP core for executing the target task; and
executing the target task by using the target IP core.

14. The apparatus according to claim 13, wherein in terms of reconfiguring the at least one reconfigurable resource package, the operations further comprise:
reconfiguring a target reconfigurable resource package in the multiple reconfigurable resource packages to be the target IP core, wherein the target reconfigurable resource package is a reconfigurable resource package with a longest idle time in the multiple reconfigurable resource packages.

15. An apparatus for task scheduling on a heterogeneous multi-core reconfigurable computing platform, wherein the apparatus comprises:
a processor, configured to execute an instruction stored in a storage;
the storage, configured to store the instruction and data, and provide the instruction and the data for the processor; and
a communications bus, configured to implement connection communication between the processor and the storage; wherein
the processor is configured to:
determine an execution manner of a target task, comprising a hardware manner or a software manner, according to popularity of the target task which is to-be-executed and usage of a reconfigurable resource of the heterogeneous multi-core reconfigurable computing platform, including:
(a) determining whether weighted popularity of the target task is greater than or equal to a product of the usage of the reconfigurable resource and a reconfiguration coefficient when the weighted popularity of the target task is greater than or equal to the product, determining the execution manner is the hardware manner; or
(b) when the weighted popularity of the target task is less than the product, determining the execution manner is the software manner;
wherein for the target task, there is no corresponding target intellectual property core for executing the target task on the heterogeneous multi-core reconfigurable computing platform, the popularity of the target task indicates central processing unit (CPU) usage of the target task, and the usage of the reconfigurable resource indicates a usage status of the reconfigurable resource; and
execute the target task according to the determined execution manner.

16. The apparatus according to claim 15, wherein the processor is configured to:
determine weighted popularity $C_w$ of the target task according to the popularity of the target task, where $C_w = C \cdot S$, C is the popularity of the target task, $C = N_1 \cdot T_1 / T_L$, $T_L$ is a time length between a current time point and a time point at which reconfiguration is performed on the reconfigurable resource last time, $N_1$ is a quantity of times for which the target task is executed within $T_L$ in the software manner, $T_1$ is a time length required for a single execution of the target task in the software manner, S is a hardware speedup ratio of the target task,
and the hardware speedup ratio S is used to indicate a ratio between a corresponding execution speed at which the target task is executed in the hardware manner and a corresponding execution speed at which the target task is executed in the software manner;
determine the usage $E_{ave}$ of the reconfigurable resource of the heterogeneous multi-core reconfigurable computing platform according to the following formulas:

$$E_{ave} = \frac{\sum_{i=1}^{M} E_i}{M}$$

$$E_i = \frac{N_2^i \cdot T_2^i}{T_L} \quad (i = 1, 2, \ldots, M),$$

wherein M is a quantity of IP cores deployed on the heterogeneous multi-core reconfigurable computing platform, $E_i$ is IP core usage of an $i^{th}$ IP core in the M IP cores deployed on the heterogeneous multi-core reconfigurable computing platform, $T_L$ is the time length between the current time point and the time point at which reconfiguration is performed on the reconfigurable resource last time, $N_2^i$ is a quantity of times for which the $i^{th}$ IP core executes a task corresponding to the $i^{th}$ IP core within the time length $T_L$, $T_2^i$ is a time length required for the $i^{th}$ IP core to execute the corresponding task once; and
determine the execution manner of the target task according to the weighted popularity $C_w$ of the target task and the usage $E_{ave}$ of the reconfigurable resource.

17. The apparatus according to claim 16, wherein the processor is configured to:
when it is determined that the weighted popularity $C_w$ of the target task is greater than or equal to a product of $E_{ave}$ and k, determine that the execution manner of the target task is the hardware manner, wherein k is a reconfiguration coefficient of the heterogeneous multi-core reconfigurable computing platform, and is used to indicate a reconfiguration overhead of the heterogeneous multi-core reconfigurable computing platform; or
when it is determined that the weighted popularity $C_w$ of the target task is less than a product of $E_{ave}$ and k, determine that the execution manner of the target task is the software manner.

18. The apparatus according to claim 15, wherein the processor is configured to:
determine a to-be-executed task; and
when an IP core for executing the to-be-executed task is not deployed on the heterogeneous multi-core reconfigurable computing platform, determine the to-be-executed task as the to-be-executed target task.

19. The apparatus according to claim 15, wherein the processor is configured to:
reconfigure at least one reconfigurable resource package in the multiple reconfigurable resource packages to be a target IP core for executing the target task; and
execute the target task by using the target IP core.

20. The apparatus according to claim 19, wherein the processor is configured to:
reconfigure a target reconfigurable resource package in the multiple reconfigurable resource packages to be the target IP core, wherein the target reconfigurable resource package is a reconfigurable resource package with a longest idle time in the multiple reconfigurable resource packages.

21. The apparatus according to claim 18, wherein the processor is configured to:
when an IP core for executing the to-be-executed task is deployed on the heterogeneous multi-core reconfigurable computing platform, determine that an execution manner of the to-be-executed task is hardware execution.

* * * * *

UNITED STATES PATENT AND TRADEMARK OFFICE
CERTIFICATE OF CORRECTION

PATENT NO. : 10,452,605 B2  
APPLICATION NO. : 15/621768  
DATED : October 22, 2019  
INVENTOR(S) : Wang et al.

Page 1 of 1

It is certified that error appears in the above-identified patent and that said Letters Patent is hereby corrected as shown below:

In the Claims

Claim 1: Column 29, Line 43: "figuration coefficient when the weighted popularity" should read -- figuration coefficient; (b) when the weighted popularity --.

Claim 1: Column 29, Line 47: "(b) when the weighted popularity of the target task is" should read -- when the weighted popularity of the target task is --.

Claim 15: Column 33, Line 39: "figuration coefficient when the weighted popularity" should read -- figuration coefficient; (b) when the weighted popularity --.

Claim 15: Column 33, Line 43: "(b) when the weighted popularity of the target task is" should read -- when the weighted popularity of the target task is --.

Claim 15: Column 33, Line 47: "target intellectual property core for executing the" should read -- target intellectual property (IP) core for executing the --.

Signed and Sealed this  
Seventh Day of September, 2021

Drew Hirshfeld  
*Performing the Functions and Duties of the  
Under Secretary of Commerce for Intellectual Property and  
Director of the United States Patent and Trademark Office*